US012683041B2

(12) United States Patent
Schuh et al.

(10) Patent No.: US 12,683,041 B2
(45) **Date of Patent: *Jul. 14, 2026**

(54) METHOD FOR COVERING ELONGATED ARTICLES, IN PARTICULAR LINES

(71) Applicant: TESA SE, Norderstedt (DE)

(72) Inventors: Christian Schuh, Hamburg (DE); Olga Kirpicenok, Ellerbek (DE)

(73) Assignee: TESA SE, Norderstedt (DE)

( * ) Notice: Subject to any disclaimer, the term of this patent is extended or adjusted under 35 U.S.C. 154(b) by 432 days.

This patent is subject to a terminal disclaimer.

(21) Appl. No.: 17/637,384

(22) PCT Filed: Aug. 20, 2020

(86) PCT No.: PCT/EP2020/073301

§ 371 (c)(1),
(2) Date: Feb. 22, 2022

(87) PCT Pub. No.: WO2021/032822

PCT Pub. Date: Feb. 25, 2021

(65) Prior Publication Data

US 2022/0306908 A1 Sep. 29, 2022

(30) Foreign Application Priority Data

Aug. 22, 2019 (DE) ........................ 10 2019 212 592

(51) Int. Cl.
*H01B 13/012* (2006.01)
*C08K 5/00* (2006.01)
(Continued)

(52) U.S. Cl.
CPC ..... *H01B 13/01263* (2013.01); *C08K 5/0025* (2013.01); *C09J 7/38* (2018.01);
(Continued)

(58) Field of Classification Search
CPC ....... C09J 7/383; C09J 7/38; C09J 5/06; C09J 109/02; C09J 2203/302; C09J 2203/354; C09J 2301/302; C09J 2301/408; C09J 2463/00; C09J 179/02; C09J 163/00; C08K 5/0025; C09D 163/00; H01B 13/26; H01B 13/268; H01B 13/01281; H01B 13/01263;
(Continued)

(56) References Cited

U.S. PATENT DOCUMENTS

| | | | | |
|---|---|---|---|---|
| 3,027,337 A | | 3/1962 | Tritsch | |
| 4,546,155 A | * | 10/1985 | Hirose ................ | C08G 59/182 528/109 |

(Continued)

FOREIGN PATENT DOCUMENTS

| | | | |
|---|---|---|---|
| DE | 27 17 582 | 11/1977 | |
| DE | 10 2013 213 726 | A1 | 1/2015 |

(Continued)

OTHER PUBLICATIONS

Kukdo "Kukdo Epoxy" Mar. 20, 2007.*
Machine translation of WO 2019/101913 date unknown.*

*Primary Examiner* — John L Goff, II
(74) *Attorney, Agent, or Firm* — Norris McLaughlin, P.A.

(57) ABSTRACT

The invention relates to a method for covering elongated articles, in particular cable sets using a curable adhesive tape.

20 Claims, 4 Drawing Sheets

(51) Int. Cl.

| | |
|---|---|
| ***C09J 7/38*** | (2018.01) |
| ***C09J 163/00*** | (2006.01) |
| ***C09J 179/02*** | (2006.01) |

(52) U.S. Cl.
CPC ........... *C09J 163/00* (2013.01); *C09J 179/02* (2013.01); *C09J 2203/354* (2020.08); *C09J 2301/302* (2020.08); *C09J 2301/408* (2020.08)

(58) Field of Classification Search
CPC ......... B29C 53/58; B29C 53/60; B29C 63/06; B29C 63/065; B29C 63/08; B29C 63/10; B29C 63/105
USPC ................. 156/53, 330, 187, 194, 217, 218; 524/322
See application file for complete search history.

(56) References Cited

U.S. PATENT DOCUMENTS

| | | | | |
|---|---|---|---|---|
| 9,613,733 | B2 | 4/2017 | Siebert et al. | |
| 10,297,370 | B1 | 5/2019 | Boecker et al. | |
| 2002/0010287 | A1* | 1/2002 | Ohashi | C08G 59/50 525/486 |
| 2014/0345797 | A1* | 11/2014 | Li | B32B 37/1284 528/297 |
| 2015/0013874 | A1* | 1/2015 | Siebert | C09J 7/35 156/52 |

FOREIGN PATENT DOCUMENTS

| | | | | |
|---|---|---|---|---|
| DE | 10 2017 221 072 | A1 | 5/2019 | |
| EP | 1848006 | A2 | 10/2007 | |
| EP | 2497805 | A1 | 9/2012 | |
| EP | 2826828 | A1 | 1/2015 | |
| FR | 2348955 | A1 | 11/1977 | |
| WO | 2015/004190 | A1 | 1/2015 | |
| WO | 2019/101913 | A1 | 5/2019 | |
| WO | WO-2019101914 | A1 * | 5/2019 | B29B 7/90 |
| WO | WO-2019101916 | A1 * | 5/2019 | B29B 7/726 |

* cited by examiner

METHOD FOR COVERING ELONGATED ARTICLES, IN PARTICULAR LINES

This application is a 371 of International Patent Application No. PCT/EP2020/073301, filed Aug. 20, 2020, which claims priority of German Patent Application No. 10 2019 212 592.1, filed Aug. 22, 2019, the entire contents of which patent applications are hereby incorporated herein by reference.

The invention relates to a method of jacketing elongate items, especially cable looms.

Adhesive tapes have been used for some time in the industry for production of cable looms. The adhesive tapes are used for bundling of a multitude of electrical wires before installation or in the already installed state in order, for example, to reduce the space requirement of the bundle of wires by bandaging and additionally to achieve protective functions such as protection from mechanical and/or thermal stress. Standard forms of adhesive tapes include film or textile carriers that are generally coated on one side with pressure-sensitive adhesives. Adhesive tapes for jacketing of elongate items are known, for example, from EP 1 848 006 A2, DE 10 2013 213 726 A1, and EP 2 497 805 A1.

Current cable looms jacketed with adhesive tape are generally flexible. However, this is often undesirable for manufacturing reasons. In manufacture, the cable harnesses are generally prefabricated to form a cable map and then inserted into the object to be equipped, for example automobiles. A cable loom map corresponds to the actual spatial arrangement of the individual cable harnesses in the cable loom, i.e. what cable harness is bent at what angle at what point, where the positions of branches or off-branches are, and which plugs are fitted to the ends of the cable harnesses.

In order to keep the individual strands of the cable loom in a particular shape, such that they can be guided around the engine, for example, in the engine compartment without coming into contact with the engine, injection-molded parts are typically mounted subsequently around the cable loom jacketed with adhesive tape. But these injection-molded parts have the drawback of additional material expenditure and complexity of assembly.

WO 2015/004190 A1 discloses a method of jacketing elongate items such as wires or cable looms in particular, in which the elongate item is wrapped with an adhesive tape with curable adhesive applied thereto in a helical line or in axial direction, and the adhesive applied to the adhesive tape is cured by supply of radiative energy such as heat. For thermal curing, a temperature of 175° C. is employed here.

It is therefore an object of the present invention to provide a method of jacketing elongate items using a rigid adhesive tape, which leads to a sufficiently stiffened item. It is also an object of the present invention to provide a product obtainable by the method.

For solution of the technical problem, a method of jacketing elongate items is proposed, comprising a carrier in strip form that has been provided on at least one side with a self-adhesive layer that is thermally curable.

This object is achieved by a method of jacketing elongate items, such as wires or cable looms in particular, with an adhesive tape comprising a carrier in strip form that has been provided on at least one side with a curable composition comprising one or more epoxy resins and at least one curing reagent for epoxy resins, wherein at least one of the epoxy resins used is a fatty acid-modified epoxy resin and the curing reagent comprises at least one epoxy-amine adduct, namely the reaction product of at least one compound having at least one cyclic ether group in the molecule and at least one amine compound, wherein the adhesive tape is run in a helical line around the elongate item or the elongate item is wrapped by the adhesive tape in axial direction, the elongate item together with the wrapping adhesive tape is put in the desired arrangement, especially in the cable loom map, the elongate item is held in this arrangement, the curable adhesive is made to cure by the supply of thermal energy particularly at a temperature between 120° C. and 200° C. for 10 to 120 minutes.

Accordingly, the invention relates to the use of a curable composition comprising at least one fatty acid-modified epoxy resin ($E_F$) and at least one curing reagent for the fatty acid-modified epoxy resin ($E_F$). According to the invention, the curing reagent comprises at least one epoxy-amine adduct. According to the invention, epoxy-amine adducts are the reaction products of at least one compound having at least one cyclic ether group in the molecule (also referred to hereinafter as compound A) and at least one amine compound (also referred to hereinafter as compound B).

BRIEF DESCRIPTION OF THE DRAWINGS

The invention will now be described in greater detail with respect to the drawings, wherein.

Figure 1:
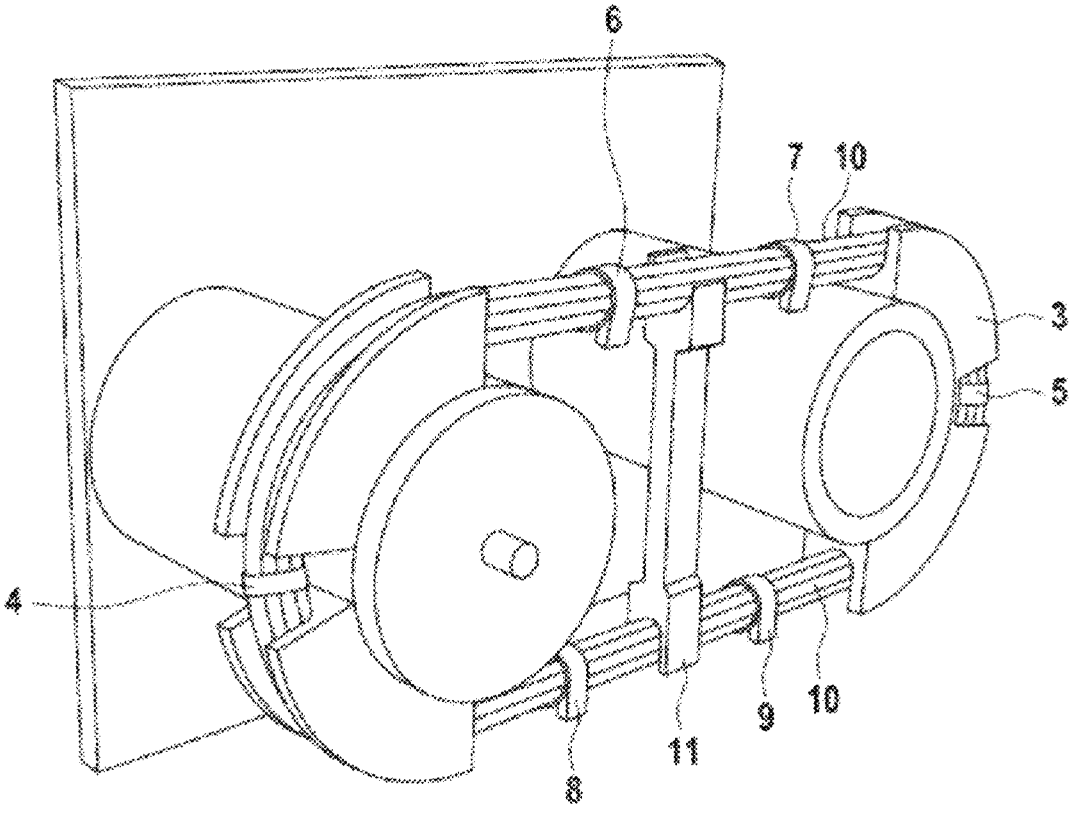
FIG. 1 is a schematic illustrating an apparatus for conducting a C-shape test for assessing cable stiffness at different temperatures.

In an advantageous procedure, compound A comprises two or more cyclic ether groups, i.e. is polyfunctional.

Cyclic ethers are compounds including one or more groups that constitute a bridge by the —O— moiety across one or more C—C bonds (cyclic ether group; groups to be identified by the prefix "epoxy" by the IUPAC definition, rules C-212.2 and R-9.2.1.4) and hence form a heterocycle composed of two or more carbon atoms and one oxygen atom.

Cyclic ether groups used particularly advantageously in accordance with the invention for compound A are epoxy groups, i.e. heterocyclic three-membered rings having two carbon atoms and one oxygen atom.

Compounds A utilized particularly advantageously are polyfunctional epoxy compounds, i.e. compounds that have two or more epoxy groups (referred to hereinafter as compound A'; where the group of compounds A' is a subgroup of compounds A and hence is encompassed by this group).

The curable composition is especially cured by the reaction of one or more reactive resins with one or more curing agents and optionally accelerators (the components of the curing reagent). The curable composition comprises at least one fatty acid-modified epoxy resin ($E_F$) as reactive resin, but may also comprise two or more fatty acid-modified epoxy resins ($E_F$). The one fatty acid-modified epoxy resin ($E_F$) or the two or more fatty acid-modified epoxy resins ($E_F$) may be the sole reactive resins in the curable composition, i.e. especially the sole components in the curable composition that can lead to curing of the composition with curing agents—optionally after appropriate activation. In principle, however, it is also possible that not only the fatty acid-modified epoxy resin ($E_F$) or not only the fatty acid-modified epoxy resins ($E_F$) but also further non-fatty acid-modified reactive resins and/or else reactive resins that are not epoxy resins are present.

Reactive resins are crosslinkable resins, namely oligomeric or short-chain polymeric compounds comprising functional groups, especially having a number-average molar mass $M_n$ of not more than 10 000 g/mol, and especially those having multiple functional groups in a macromolecule. Since the resins are a distribution of macromolecules of different individual masses, the reactive resins may contain fractions wherein the number-average molar mass is much higher, for example up to about 100 000 g/mol; this is especially true of polymer-modified reactive resins, for example elastomer-modified reactive resins.

Reactive resins differ from tackifying resins frequently used for adhesives, especially for pressure-sensitive adhesives. A "tackifying resin", according to the general understanding of those skilled in the art, is understood to mean an oligomeric or polymeric resin that merely increases adhesion (tack, intrinsic tackiness) of the pressure-sensitive adhesive compared to the pressure-sensitive adhesive that does not contain any tackifying resin but is otherwise identical. Typically, tackifying resins, apart from double bonds (in the case of the unsaturated resins), do not contain any reactive groups since their properties are not supposed to change over the lifetime of the pressure-sensitive adhesive.

The functional groups of the reactive resins are such that they lead to curing of the composition comprising the reactive resins and a curing reagent under suitable conditions—especially after activation, for example by elevated temperature (thermal energy) and/or by actinic radiation (such as light, UV radiation, electron beams etc.) and/or by initiation and/or catalysis by further chemical compounds, for instance water (moisture-curing systems)—especially by a crosslinking reaction. Curing reagents may be formed, for example, from one curing agent or from a mixture of two or more curing agents or from a mixture of one or more curing agents with accelerators.

Epoxy resins in the context of this document referred to reactive resins comprising epoxy groups, particularly those having more than one epoxy group per molecule, i.e. those reactive resins in which the functional groups or at least some of the functional groups are epoxy groups. The conversion of the epoxy resins during the curing reaction of the curable composition is especially effected by polyaddition reactions with suitable epoxy curing agents or by polymerization via the epoxy groups. According to the choice of epoxy curing agent, it is also possible for both reaction mechanisms to take place in parallel.

A curing agent in the context of this document refers, in accordance with DIN 55945:1999-07, to the chemical compound(s) that act(s) as binder and is/are added to the curable resins in order to bring about the curing (crosslinking) of the curable composition, especially in the form of an applied film. In the curable compositions, "curing agent" is accordingly the name for that component which brings about the chemical crosslinking after mixing with the reactive resins and appropriate activation.

"Accelerator" in the context of this document refers to those chemical compounds which, in the presence of another curing agent, increase the reaction rate of the curing reaction and/or the rate of activation of the curing of the epoxy resins, especially in a synergistic manner.

There is overlap here between the lists for selection of the substances usable as curing agent or as accelerator, it being possible for the individual representatives also to simultaneously implement both modes of function, and so there is generally a fluid transition between curing agent and accelerator. In addition, chemical compounds that are utilized as curing agent alone frequently act as accelerator when used with a further curing agent. Curing reactions are fundamentally identifiable as a peak in dynamic differential calorimetry (DSC). An accelerator is especially understood to mean those compounds whose addition results in a shift in the curing peak of a particular curing agent toward lower temperatures. Additional curing agents, by contrast, are especially those compounds that lead to a second peak—generally present in isolation, but possibly also overlapping the first peak—for a curing reaction in the DSC.

The term "curing reagent"—by contrast with the individual curing agents and accelerators—refers to the entirety of the curing agents used and any accelerators for the curing reaction by means of the corresponding reactive component (the corresponding reactive resin(s)). The curing reagent may accordingly especially be formed from one or more curing agent(s) or from one or more curing agent(s) in the presence of one or more accelerator(s).

Co-)curing agents in the context of this document refer to the individual components of the curing reagent, which thus form this curing reagent overall. The term "(co-)curing agent" thus represents a curing agent or accelerator respectively present. The epoxy-amine adduct when used alone—i.e. as the sole component of the curing reagent—serves here as curing agent for the curing reaction of the curable composition. If it is used together with further chemical compounds that serve as curing agent and/or accelerator, it may itself serve as curing agent or as accelerator for the curing reaction of the curable composition.

In the further description of components, compounds, compositions or the like that may be used individually or multiply within the scope of the teaching of the present document (introduced, for example, by "at least one epoxy resin" or "one or more epoxy resins"), the use of the plural hereinafter shall encompass the singular (the statement "advantageous epoxy resins are selected from the list of compounds X, Y, Z" thus also includes the disclosure that, in the case of presence of just one epoxy resin, this may advantageously be selected from the list mentioned). Conversely, the use of the singular shall not restrict the specification to the case where the component is used only individually (the statement "examples of the epoxy resin advantageously include the compounds X, Y and Z" thus also includes the disclosure that, in the case that multiple epoxy resins are present, all may advantageously be chosen from this list).

If the singular or plural is specifically important in the particular case, this is stated at the corresponding point.

Epoxy Resins

Fatty acid-modified epoxy resins ($E_F$) used are preferably epoxy resin esters, also called epoxy esters, i.e. the esterification products of epoxy resins with saturated or unsaturated fatty acids.

It is possible for a single fatty acid-modified epoxy resin ($E_F$) or for two, three or even more fatty acid-modified epoxy resins ($E_F$) to be present in the curable composition. The curable composition may be limited to the fatty acid-modified epoxy resin(s) ($E_F$) as curable reactive resins. As well as the fatty acid-modified epoxy resin(s) $E_F$, it is also possible for further, non-fatty acid modified epoxy resins and/or reactive resins that are not epoxy resins to be present.

The proportion of the fatty acid-modified epoxy resins ($E_F$) based on the total amount of reactive resins used overall in the curable composition may be up to 100%. For bonds having particularly high bond strengths even at high temperatures, comparatively lower proportions—for example 5% to 25% by weight—are chosen. For good performance even after storage under moist and hot conditions, proportions between 10% and 50% by weight, especially 20% to 40% by weight, have been found to be excellent. With the aforementioned proportions, it is advantageous to choose the remainder of the reactive resins likewise as epoxy resins, except that these are then not fatty acid-modified.

If just one fatty acid-modified epoxy resin (Er) is present, this may especially be selected from the fatty acid-modified epoxy resins described as preferred hereinafter. If multiple fatty acid-modified epoxy resins (Er) are present, advantageously at least one of the epoxy resins is one of the compounds described hereinafter as preferred fatty acid-modified epoxy resins. Further preferably, all fatty acid-modified epoxy resins ($E_F$) are those as described as preferred hereinafter.

According to the invention, at least some of the epoxy resins are fatty acid-modified epoxy resins. The chemical modification of epoxy resins can be utilized for control of the properties of adhesives. Fatty acid group-modified epoxy resins are those epoxy resins to which one or more fatty acids are chemically bound, especially by esterification reactions.

Epoxy resins used for preparation of the fatty acid-modified epoxy resin (Er) within the scope of epoxy resin esters may, for example, be bisphenol-based epoxy resins (especially having number-average molar masses $M_N$ of up to about 10 000 g/mol) and/or novolak-based epoxy resins (especially having number-average molar masses $M_N$ of up to about 2000 g/mol), which, in accordance with the remarks made above, may also include fractions having higher number-average molar masses.

The epoxy resin base used for the fatty acid-modified epoxy resins ($E_F$), especially epoxy esters, may especially be epoxy resins of the bisphenol A/epichlorohydrin type according to the general formula remove the water reaction released. Optionally, the reaction is accelerated by addition of catalysts, for example calcium or zinc soaps, for example fatty acids such as stearic acid. According to the desired property, 40% to 80% of the functional groups available in the epoxy resin are reacted with fatty acids.

An epoxy resin of the n type (corresponding to the number of free OH groups along the chain) can theoretically bind an average of not more than n+4 fatty acid molecules per epoxy resin molecule (esterification level 100%). Accordingly, in the case of epoxy resin esters, the "oil length" is defined as follows:

short-oil: esterification level 30-50%;

mid-oil: esterification level 50-70%;

long-oil: esterification level 70-90%.

Examples of fatty acids of good suitability in accordance with the invention for the esterification include coconut oil fatty acid, ricinene fatty acid (fatty acid of the hydrogenated castor oil), linseed oil fatty acid, soya oil fatty acid or tall oil fatty acid.

Further fatty acids that are advantageous in accordance with the invention are α-linolenic acid, stearidonic acid, eicosapentaenoic acid, docosahexaenoic acid, linoleic acid, γ-linolenic acid, dihomo-gamma-linolenic acid, arachidonic acid, docosa-7,10,13,16-tetraen-1-oic acid, palmitoleic acid, vaccenic acid, oleic acid, elaidic acid, gadoleic acid, 13-eicosenoic acid, erucic acid, nervonic acid, stearic acid, Mead's acid.

Also usable are dimers and oligomers of unsaturated fatty acids, for example the dimers of tall oil fatty acids.

Preferably, the one fatty acid-modified epoxy resin ($E_F$) or—if further epoxy resins are present—at least one of the fatty acid-modified epoxy resins is a liquid epoxy resin, especially one having a softening temperature of at least 45° C. or one having a dynamic viscosity of less than 500 Pa*s, measured to DIN 53019-1 at a measurement temperature of 25° C. and a shear rate of $1 \times s^{-1}$.

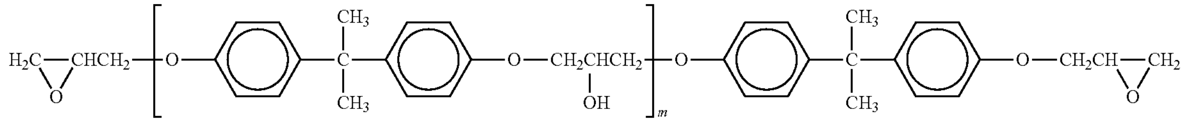

In general, this is a mixture of corresponding compounds of the formula (IV) with varying repeat number m of the unit in the square brackets. The bisphenol epoxy resin here is especially chosen such that the average of m=0.07 to 16.4, i.e. the number-average molar masses are between about 350 g/mol and 4750 g/mol. Particular preference is given to using compounds of the formula 1 with m=2.3 to m=10 in pure form (with integer values for m) or in the form of mixtures (corresponding to number-average molar masses between about 1000 and about 3000 g/mol).

Both the terminal epoxy groups and secondary hydroxy groups of bisphenol-based epoxy resins can react with fatty acids. The esterification typically first opens up the two epoxy rings, followed by the reaction of the hydroxy groups.

Each epoxy group here is equivalent to 2 hydroxy groups since the reaction of an acid group with an epoxide gives rise to a β-hydroxy ester. These β-hydroxy groups can also react with fatty acids. The preparation is typically effected at temperatures of 240-260° C. under protective gas atmosphere, preferably under azeotropic conditions, in order to The curable composition of the invention may, as well as the fatty acid-modified epoxy resin(s) $E_F$, comprise further epoxy resins that are not fatty acid-modified, and/or reactive resins that are not epoxy resins.

Further non-fatty acid-modified epoxy resins that may be present in accordance with the invention may in principle be chosen from the pool of curable epoxy resins known to the person skilled in the art and may, for example, also be silane-modified epoxy resins and/or elastomer-modified, especially nitrile rubber-modified, epoxy resins.

In a favorable execution of the adhesive tape of the invention, the epoxy resins comprise a mixture of epoxy resins that are liquid at 25° C. and solid at 25° C. The proportion of liquid epoxy resins in the epoxy resins is especially 10% to 90% by weight, further preferably 20% to 75% by weight. The respective difference from 100% by weight of the epoxy resins is then made up by solid epoxy resins. Adhesive tapes with such ratios of liquid and solid epoxy components show particularly balanced adhesive properties in the uncured state. If an adhesive tape having particularly good adaptation properties is desired, the proportion of liquid epoxy components is preferably 50% to 80% by weight. For applications in which the adhesive tapes even in the uncured state have to bear a relatively high load, a proportion of 15% to 45% by weight is particularly preferred. It is possible to use one such resin or else a mixture of different resins. Especially advantageously, at least one of the liquid epoxy resins comprises fatty acid-modified epoxy resins ($E_F$).

Further preferably, the epoxy resins comprise at least two different epoxy resins (E-1) and (E-2), of which a. the first epoxy resin (E-1) at 25° C. has a dynamic viscosity of less than 500 Pa*s, measured to DIN 53019-1 at a measurement temperature of 25° C. and a shear rate of $1\times s^{-1}$, and b. of which the second epoxy resin (E-2) has a softening temperature of at least 45° C. or at 25° C. has a dynamic viscosity of at least 1000 Pa*s, measured to DIN 53019-1 at a measurement temperature of 25° C. and a shear rate of $1\times s^{-1}$, where, in particular, the proportion of the first epoxy resin (E-1) is 10% to 90% by weight, preferably 20% to 75% by weight, and the proportion of the second epoxy resin (E-2) is 10% to 90% by weight, preferably 25% to 80% by weight, based on the totality of epoxy resins. Advantageously, the epoxy resin component consists of these two epoxy resins (E-1) and (E-2), such that the proportion of two epoxy resins (E-1) and (E-2) in the total epoxy resin adds up to 100% by weight.

It is especially possible here for the epoxy resin (E-1) to be the fatty acid-modified epoxy resin ($E_F$).

Particularly good adhesives are obtained when the proportion of epoxy resin (E-2) is in the range from 40% to 80% by weight, especially 60% to 75% by weight. In a specific embodiment, the proportion of epoxy resins (E-2) having a softening temperature of at least 45° C. is at least 35% by weight, especially in the range from 40% to 70% by weight.

The cohesion of the uncrosslinked pressure-sensitive adhesives, given adequate tack, is particularly good when the proportion of epoxy resins having a softening temperature of at least 45° C. is at least 15% by weight, especially in the range from 20% by weight to 75% by weight, based on the overall epoxy resin. Adaptation characteristics are improved when less than 55% by weight, especially between 25% by weight and 45% by weight, is present.

Elastomer-modified epoxy resins should be understood to mean epoxy resins that are especially liquid and generally of high viscosity and have an average functionality of at least two and an elastomer content of up to 50% by weight, preferably one of 5-40% by weight. The epoxy groups may be in a terminal arrangement and/or in the side chain of the molecule. The elastomeric structure component of these flexibilized epoxy resins consists of polyenes, diene copolymers and polyurethanes, preferably of polybutadiene, butadiene-styrene or butadiene-acrylonitrile copolymers.

An example of an epoxy resin modified by butadiene-acrylonitrile copolymers (nitrile rubber) is an epoxy prepolymer which is obtained by modification of an epoxy resin having at least two epoxy groups in the molecules with a nitrile rubber. The epoxy base used is advantageously a reaction product of glycerol or propylene glycol and a halogen-containing epoxy compound, such as epichlorohydrin, or the reaction product of a polyhydric phenol, such as hydroquinone, bisphenol A, and a halogen-containing epoxide. What is desirable is a reaction product formed from an epoxy resin of the bisphenol A type having two terminal epoxy groups.

For binding of the epoxy resins, in the case of butadiene polymers or butadiene-acrylonitrile copolymers (so-called nitrile rubbers), it is possible to include a third monomer with acid function—for example acrylic acid—in the polymerization. The acid and the nitrile rubbers give what are called carboxy-terminated nitrile rubbers (CTBN). In general, these compounds contain acid groups not just at the ends but also along the main chain. CTBNs are supplied, for example, under the Hycar trade name by B. F. Goodrich. These have molar masses between 2000 and 5000 and acrylonitrile contents between 10% and 30%. Specific examples are Hycar CTBN 1300×8, 1300×13 or 1300×15. The reaction proceeds correspondingly with butadiene polymers.

Reaction of epoxy resins with CTBNs affords what are called epoxy-terminated nitrile rubbers (ETBNs), which are used with particular preference for this invention. Such ETBNs are commercially available, for example, from Emerald Materials under the HYPRO ETBN name (formerly Hycar ETBN)—for example Hypro 1300×40 ETBN, Hypro 1300×63 ETBN and Hypro 1300×68 ETBN. One example of an epoxy-terminated butadiene rubber is Hypro 2000×174 ETB.

Further examples of elastomer-modified epoxy-functional compounds are a reaction product of a diglycidyl ether of neopentyl alcohol and a butadiene/acrylonitrile elastomer having carboxyl ends (for example EPON™ Resin 58034 from Resolution Performance Products LLC), a reaction product of a diglycidyl ether of bisphenol A and a butadiene/acrylonitrile elastomer having carboxyl ends (for example EPON™ Resin 58006 from Resolution Performance Products LLC), a butadiene/acrylonitrile elastomer having carboxyl ends (for example CTBN-1300×8 and CTBN-1300×13 from Noveon, Inc., Cleveland, Ohio), and a butadiene/acrylonitrile elastomer having amine ends (for example ATBN-1300×16 and ATBN-1300×42 from Noveon, Inc.). One example of the elastomer-modified epoxy resin adduct is the reaction product of an epoxy resin based on bisphenol F and a butadiene/acrylonitrile elastomer having carboxyl ends (for example EPON™ Resin 58003 from Resolution Performance Products LLC).

The proportion of the elastomer-modified epoxy resins based on the total amount of epoxy resins may be chosen differently according to the desired effect. For bonds having particularly high bond strength and low elongation, comparatively lower proportions—for example 0% to 15%—are chosen. By contrast, adhesives with high elongation values are obtained when the proportion is greater than 40%, especially greater than 60%. For many applications, a balanced ratio between bond strength and elongation is desired. Preference is given here to proportions between 20-60%, especially 30-50%.

Further suitable representatives used for the epoxy resins may very advantageously, in addition to the fatty acid-modified epoxy resins and any further epoxy resins present, be silane-modified epoxy resins. Silane group-modified epoxy resins are those epoxy resins to which one or more silane groups are chemically bonded. In principle, there are different ways of binding silane groups chemically to epoxy resins.

Advantageously, it is possible, for instance, to use silane-modified epoxy resins obtainable by dealcoholizing condensation reaction between a bisphenol epoxy resin and a hydrolyzable alkoxysilane. Such epoxy resins are described, for example, in EP 1114834 A, the disclosure content of which is hereby incorporated into the present document by reference.

The bisphenol epoxy resin may advantageously be chosen such that it has an epoxy equivalent weight of more than 180 g/eq, and preferably of less than 5000 g/eq. For epoxy resins or epoxy crosslinkers, the epoxy equivalent weight (abbreviation: EEW) is a characteristic and important parameter. According to DIN EN ISO 3001:1999-11, the epoxy equivalent weight indicates the amount of the substance in question in the solid state in grams that is bound per epoxy group. Preference is given to using epoxy resins having an EEW>180 g/eq, since there may otherwise be insufficient hydroxy groups for the condensation with the alkoxysilanes.

In a preferred manner, the bisphenol epoxy resin used for reaction with the hydrolyzable alkoxysilane comprises compounds conforming to the formula already introduced

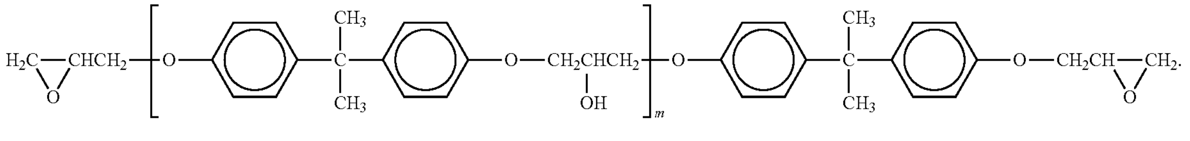

In general, this is a (I ure of corresponding compounds of the formula (I) with varying repeat number m of the unit in the square brackets. The bisphenol epoxy resin here is especially chosen such that the average of m is 0.07 to 16.4, i.e. the number-average molar masses are between about 350 g/mol and 4750 g/mol.

In a further preferred manner, the hydrolyzable alkoxysilane is either a compound conforming to the general formula $$R^X_pSi(OR^Y)_{4-p} \quad (II)$$

where p is 0 or 1, $R^X$ is a $C_1$-$C_{20}$ alkyl group, an aryl group or an unsaturated aliphatic hydrocarbyl group that may have a functional group bonded directly to a carbon atom, RY represents a hydrogen atom or a lower alkyl group, and the RY radicals may be the same or different, or the hydrolyzable alkoxysilane is a partial condensate of the compound mentioned. The functional group bonded directly to a carbon atom may, for example, be a vinyl group, mercapto group, epoxy group, glycidoxy group etc. The lower alkyl group may, for example, be an unbranched or branched alkyl group having 6 or fewer carbon atoms.

Examples of the hydrolyzable alkoxysilane include tetramethoxysilane, tetraethoxysilane, tetrapropoxysilane, tetraisopropoxysilane, tetrabutoxysilane and similar tetraalkoxysilanes; methyltrimethoxysilane, methyltriethoxysilane, methyltripropoxysilane, methyltributoxysilane, ethyltrimethoxysilane, ethyltriethoxysilane, n-propyltrimethoxysilane, npropyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxy silane, 3-mercaptopropyltriethoxysilane, phenyltrimethoxysilane, phenyltriethoxysilane, 3,4-epoxycyclohexylethyltrimethoxysilane, 3,4-epoxycyclohexylethyltrimethoxysilane and similar trialkoxysilanes; or partial condensates of these compounds.

Among these compounds, preference is given to tetramethoxysilane, tetraethoxysilane and similar tetralkoxysilanes or partial condensates thereof. Particular preference is given to poly(tetramethoxysilane), which is a partial condensate of tetramethoxysilane, represented by the formula

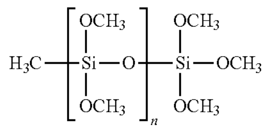

(II (where the average of n is 1 to 7). The poly(tetramethoxysilane) represented by the formula (III) may contain a molecule in which n is 0, provided that the average of n is 1 or greater. The number-average molar mass of the poly (tetramethoxysilane) is preferably about 260 to about 1200.

In addition, poly(tetramethoxysilane) is non-toxic, by contrast with tetramethoxysilane.

Further advantageously, it is possible to use those silane-modified epoxy resins obtainable by modification of bisphenol diglycidyl ether with alkoxysilanes bearing an epoxy group. Such silane-modified epoxides and the preparation process therefor are described in U.S. Pat. No. 8,835,574 A, the disclosure content of which is likewise incorporated into this document by reference. In the process outlined therein, the epoxyalkoxysilane is initially partly hydrolyzed and partly condensed in the presence of water. In a second step, a bisphenol diglycidyl ether is added and bound to the partial siloxane condensate.

In a further synthesis route for silane-modified epoxy resins usable advantageously in accordance with the invention, alkoxysilanes containing an isocyanate group are bound to the aliphatic hydroxyl group to form a urethane group.

Curing Reagent

As already set out above, the curing reagent comprises the sum total of the (co-)curing agents, i.e. the entirety of the curing agents present and any accelerators present, where at least one epoxy-amine adduct is present. The at least one epoxy-amine adduct of the curing reagent may serve as curing agent and/or as accelerator for the curing reaction. The statements made in the context of this document with regard to the epoxy-amine adduct are applicable regardless of whether it is used as curing agent or as accelerator, unless explicit reference is made to one of the end uses in the individual case.

The epoxy-amine adducts serve more particularly as curing agent for the fatty acid-modified epoxy resins present. If further, non-fatty acid-modified epoxy resins are present, the epoxy resins may also serve as (co-)curing agents for these further epoxy resins. The amounts stated hereinafter are therefore based on the total amount of epoxy resins to be cured, including the fatty acid-modified epoxy resins.

Epoxy-amine adducts typically do not have to be used in stoichiometric amounts, based on the functionality of the epoxy resin to be cured, in order to display good action as curing agent or as accelerator.

If an epoxy-amine adduct is used as the sole curing agent, typical amounts used are 15 to 35 parts by weight per 100 parts by weight of the epoxy resin(s) to be cured. If multiple epoxy-amine adducts are used, the sum total of the amounts used is advantageously within the aforementioned range.

In an alternative procedure, the amount of the epoxy-amine adduct used—or the total amount when multiple epoxy-amine adducts are used—is preferably in the range from 0.1 to 10 parts by weight, especially from 0.5 to 5 parts by weight, preferably from 1 to 3 parts by weight, based in each case on 100 parts by weight of the epoxy resin(s) to be cured—especially when the epoxy-amine adduct(s) is/are used as accelerator—for example in combination with non-epoxy-amine adducts as curing agent. In all cases—in particular when the epoxy-amine adduct is a relatively weak accelerator—it is advantageous to use amounts in the range of 4-8 parts by weight.

In order to obtain particularly storable reactive adhesives (storability being determinable, for instance, by the storage time) even at elevated temperatures—for example at 60° C., it has been found that, surprisingly, contrary to expectation, it is insufficient to select curing agents or accelerators solely ensuring that the softening point thereof is above the storage temperature. For instance, systems having a softening point above the storage temperature are frequently processible, but nevertheless have poor storabilities within the temperature range in question. For example, systems having a softening point according to MSDS of softening point 70° C. (Intelimer 7004) or even of 89° C. (Epikure P-101) have relatively poor storabilities at 60° C.: $L_f60<30\%$.

For that reason, in a particularly preferred embodiment, preference is given to those epoxy-amine adducts having a softening point of not less than 100° C. (softening point determined with a melting point analyzer). By way of example, these are products from Ajinomoto (for example PN-50, PN-40, MY-25, MY-24) or ACCI "Technicure LC-80").

In a particularly preferred form, the epoxy-amine adduct, or all epoxy-amine adducts in the presence of multiple epoxy-amine adducts, are used in particulate form. This can be achieved, for example, in that the epoxy-amine adduct is in dispersed form in the curable composition, and more particularly is not soluble in any other component of the adhesive tape, especially not even partly soluble.

The use of the (co-)curing agent in undissolved or particulate form leads to an at least partly biphasic system and hence to an elevated storage stability of the curable composition. Advantageously, the dispersion should persist even at well above room temperature (for example up to at least 90° C. for instance, preferably up to 100° C. Only on attainment of the later curing temperature is activation of the curing reagent required; in that the particulate curing agents go partly or completely into the dissolved state.

It has been found that, surprisingly, epoxy-amine adducts can also be processed thermally, for example at 90° C., when the viscosity of the curable composition—especially the adhesive, contrary to expectation, is high even at this high temperature. One assumption—without wishing to commit to this theory—is that the unwanted premature dissolution of such adducts in reactive resins is slowed or suppressed on account of the high viscosity. Advantageous viscosities of the hot curable composition have been found to be greater than 10 Pa s at 90° C., especially greater than 100 Pa s. Even curable compositions having viscosities exceeding 1000 Pa s at 90° C. were processible both in an extruder and in a laboratory kneader and showed very preferred storabilities, which is attributed to the surprising interaction between melt viscosity and epoxy-amine adducts. The person skilled in the art would certainly prefer lower viscosities since the adduct particles could be brought into solution by distinctly lower shear forces in such a system.

(Co-)curing agents of the epoxy-amine adduct type include the reaction products of one (or more) amine compound(s) (compound B) with one (or more) compound(s) comprising one or more cyclic ether groups, especially epoxy groups (compound A or A').

The epoxy-amine adduct, or one, more than one or more preferably all epoxy-amine adducts when multiple epoxy-amine adducts are present, may advantageously be used in the form of one of the compounds described as particularly advantageous hereinafter, where the individual representatives may be selected independently when multiple epoxy-amine adducts are present.

In the context of the amine compound (compound B) as starting material for the latent (co-)curing agent of the amine adduct type, it is possible in principle to use any desired amine compound, provided that it has one or more active hydrogen atoms that can enter into an addition reaction with an epoxy group, and one or more functional groups per molecule selected from the group consisting of primary amino groups, secondary amino groups and tertiary amino groups, including imidazole groups as well. Examples of such amine compounds B include aliphatic amines, for instance diethylenetriamine, triethylenetetramine, n-propylamine, 2-hydroxyethylaminopropylamine, cyclohexylamine and 4,4'-diaminodicyclohexylmethane; aromatic amine compounds, for instance 4,4'-diaminodiphenylmethane and 2-methylaniline; and nitrogen atom-containing heterocyclic compounds, for instance 2-ethyl-4-methylimidazole, 2-ethyl-4-methylimidazoline, 2,4-dimethylimidazoline, piperidine and piperazine.

Among these, in particular, one (or else more) compound(s) having at least one tertiary amino group per molecule (compound $B_t$; the compounds $B_t$ thus form a subgroup of compounds B) may be used as starting material, which affords a latent curing agent having excellent curing efficiency; such curing agents can also advantageously be used as co-curing agent (accelerator) with excellent curing acceleration capacity. In a preferred execution of the invention, the compound having at least one tertiary amino group (compound $B_t$), in each molecule, additionally has at least one further group in the molecule selected from the list L consisting of —OH (hydroxy group), —NH (secondary amino group), —$NH_2$ (primary amino group), —SH (sulfanyl group, synonym: mercapto group), —COOH (carboxy group), —$CONHNH_2$ (acid hydrazide group) (these compounds having at least one tertiary amino group and at least one further group from the list L mentioned in the molecule, by way of further characterization, are also referred to as compound $B_t'$; the group of compounds $B_t'$ thus forms a subgroup of the compounds $B_t$). In an advantageous manner, component B consists exclusively of compounds $B_t$, further advantageously exclusively of compounds $B_t'$.

Examples of compounds $B_t'$ having at least one tertiary amino group and at least one further group from list L that are suitable in accordance with the invention include primary or secondary amines having a tertiary amino group in the molecule, for example amine compounds such as dimethylaminopropylamine, diethylaminopropylamine, di-n-propylaminopropylamine, dibutylaminopropylamine, dimethylaminoethylamine, diethylaminoethylamine and N-methylpiperazine, and imidazole compounds such as 2-methylimidazole, 2-ethylimidazole, 2-ethyl-4-methylimidazole and 2-phenylimidazole; and alcohols, phenols, thiols, carboxylic acids and hydrazides having a tertiary amino group in the molecule, for instance 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-β-hydroxyethylmorpholine, 2-dimethylaminoethanethiol, 2-mercaptopyridine, 2-benzoimidazole, 2-mercaptobenzoimidazole, 2-mercaptobenzothiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic hydrazide, nicotinic hydrazide and isonicotinic hydrazide.

Cyclic ethers, especially epoxy compounds, that may be used as one of the starting materials for epoxy-amine adducts within the scope of compound A' in order to prepare latent curing agents/accelerators of the solid dispersion type include, for example, a polyglycidyl ether that has been obtained by reaction of a polyhydric phenol, for instance bisphenol A, bisphenol F, bisphenol AD, catechol, bisphenol S or resorcinol, or of a polyhydric alcohol, for instance glycerol or polyethylene glycol, with epichlorohydrin; a glycidyl ether ester that has been obtained by reaction of a hydroxycarboxylic acid, for instance p-hydroxybenzoic acid or β-hydroxynaphthoic acid, with epichlorohydrin; a polyglycidyl ester that has been obtained by reaction of a polycarboxylic acid, for instance phthalic acid or terephthalic acid, with epichlorohydrin; a glycidylamine compound that has been obtained by reaction of 4,4'-diaminodiphenylmethane or m-aminophenol with epichlorohydrin; a polyfunctional epoxy compound, for instance an epoxidized phenyl-novolak resin; an epoxidized cresol-novolak resin; an epoxidized bisphenol A novolak; or an epoxidized polyolefin; and a monofunctional epoxy compound, for instance butyl glycidyl ether, phenyl glycidyl ether or glycidyl methacrylate.

In order to even further improve the stability of the epoxy-amine adducts and hence the storage stability of the curable composition comprising fatty acid-modified epoxy resins, the (co-)curing agent of the epoxy-amine type (i.e. the adduct formed from compounds A and B) may be modified further by adding, as an optional third starting material in the course of preparation thereof, a stabilizing component (by way of identification also referred to as component C hereinafter, consisting of one or more compounds C); such as, in particular, one or more active hydrogen compounds for instance, having two or more active hydrogens per molecule.

Examples of such active hydrogen compounds include polyhydric phenols—for instance bisphenol A, bisphenol F, bisphenol S, hydroquinone, catechol, resorcinol, pyrogallol and phenol-novolak resins; polyhydric alcohols—for instance trimethylolpropane.

Active hydrogen compounds used for the stabilizing component C may also be carboxylic acids. Carboxylic acids of good suitability in accordance with the invention as representatives of compound C are especially polybasic carboxylic acids, for instance adipic acid and phthalic acid; 1,2-dimercaptoethane; 2-mercaptoethanol; 1-mercapto-3-phenoxy-2-propanol; mercaptoacetic acid; anthranilic acid; and/or lactic acid.

In an advantageous execution of the invention, component C is used in the presence of 0.05 to 5.0 molar equivalents of water per molar equivalent of epoxy groups in component A"; further advantageously, the target ratio of water molecules to epoxy groups of component A' is in the region of 1:1.

The latent (co-)curing agent of the epoxy-amine adduct type usable according to present invention may be obtained, for example, by mixing the relevant starting materials in a combination of (i) two starting materials, namely one amine compound (compound B) and one epoxy compound (compound A), or (ii) three starting materials, namely the two starting materials (compounds A and B) and the stabilizing component (compound(s) C), converting the mixture at a temperature within a range from room temperature to 200° C., then cooling, solidifying and pulverising the reaction mixture, or by converting the starting materials in a solvent such as methyl ethyl ketone, dioxane or tetrahydrofuran, removing the solvent and then pulverizing the solid material. The groups of compounds do of course also include the respective subgroups.

The epoxy-amine adducts of the invention, especially epoxy-amine adducts obtained as described above, may be stabilized in a manner advantageous in accordance with the invention, or—in the case that the stabilizing component C is present—additionally stabilized, when the preparation of the amine adduct is followed by addition of one or more borate ester compounds and/or one or more isocyanate compounds (by way of further identification also referred to hereinafter as component D, consisting of compounds D), and hence use for deactivation of free amino groups. In the activation of the (co-)curing agents, the amine groups are then converted back to the active form.

The epoxy-amine adduct, when used alone, serves as curing agent for the curing reaction of the curable composition. If it is used together with further chemical compounds that serve as curing agent and/or accelerator, it may itself serve as curing agent or as accelerator for the curing reaction of the curable composition.

In a particularly preferred embodiment, the (co-)curing agent used is at least one epoxy-amine adduct which comprises or is the reaction product of (a) a functional epoxy component A', (b) a compound $B_t$' having both an OH group, $NH_2$ group, NH group or SH group and a tertiary amino group in the molecule and (c) a stabilizing component C' (referred to hereinafter as epoxy-amine adduct of the A'$B_t$"C' type).

The compounds A' here form a subgroup of compounds A; $B_t$" form a subgroup of compounds $B_t$' and hence also of compounds B and $B_t$; and compounds C' that represent component C' form a subgroup of compounds C. In an advantageous manner, a single compound C' is used as component C'.

As already set out above, these epoxy-amine adducts of the A'$B_t$"C' type may be stabilized after preparation thereof by (d) borate ester compounds and/or isocyanate compounds (compounds D).

In an advantageous execution, compounds $B_t$" do not include any acid groups or any acid hydrazide groups in the molecule.

The epoxy-amine adduct of the A'$B_t$"C' type may be used in the curing reagent as the sole curing agent, as (co-)curing agent in combination with further (co-) curing agents in the form of epoxy-amine adduct—specifically those that are likewise the reaction product of (A) a polyfunctional epoxy component A', (b) a compound $B_t$" having both an OH group, $NH_2$ group, NH group or SH group and a tertiary group in the molecule, and (c) a stabilizing component C' (i.e. likewise of the A'$B_t$"C' type), and/or with those that do not meet this condition (i.e. not of the A'$B_t$" ° C.' type)—and/or in combination with (co-)curing agents that are not epoxy-amine adducts.

The epoxy-amine adduct of the A'$B_t$"C' type, or one, more than one or more preferably all ethoxy-amine adducts of the A'$B_t$"C' type when multiple epoxy-amine adducts of the A'$B_t$"C' type are present, may advantageously be used in the form of one of the compounds described as particularly advantageous hereinafter, where the individual representatives may be selected independently when multiple epoxy-amine adducts of the A'$B_t$"C' type are present. independently when multiple epoxy-amine adducts of the A'$B_t$"C' type are present.

The polyfunctional epoxy component A' may in principle be chosen as defined above and may, for example, be a polyglycidyl ether, a polyglycidyl ether ester, a polyglycidyl ester, a glycidylamine, an epoxidized novolak or an epoxidized polyolefin.

As compound Bt", it is advantageously possible to use compounds of the general formula

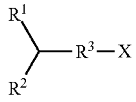

where

X is —OH, —$NH_2$, —NH or —SH, $R^1$ and $R^2$ are independently selected from the group consisting of
- hydrogen atoms,
- $C_1$— to $C_{20}$-alkyl groups,
- $C_2$— to $C_{20}$-alkenyl groups,
- unsubstituted aromatic hydrocarbyl groups,
- substituted aromatic hydrocarbyl groups, especially substituted by oxygen, halogen, —OH, —$NH_2$, —NH and/or —SH, $R^3$ is a saturated or unsaturated, unbranched or branched hydrocarbon chain having 1 to 20 carbon atoms.

Further advantageously, it is possible to choose, as compound $B_t$", compounds of the general formula (I)

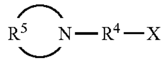

or (I)

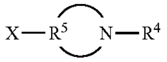

where

X is —OH, —$NH_2$, —NH or —SH, $R^4$ is a saturated or unsaturated, unbranched or branched hydrocarbon chain having one to 20 carbon atoms, $R^5$ is a cyclic aliphatic or aromatic, saturated or unsaturated, substituted or unsubstituted hydrocarbon radical which has two bonds to the nitrogen atom and has 2 to 20 carbon atoms, and which may be partly substituted by heteroatoms, where $R^5$ thus forms a ring with the nitrogen atom.

Especially advantageously, it is possible to choose, as compound $B_t$", compounds of the general formula (I)

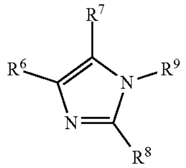

where $R^6$, $R^7$, $R^8$ and $R^9$ are independently selected from the group consisting of
- hydrogen atoms,
- $C_1$— to $C_{20}$-alkyl groups,
- $C_2$— to $C_{20}$-alkenyl groups,
- unsubstituted aromatic hydrocarbyl groups,
- substituted aromatic hydrocarbyl groups, especially substituted by oxygen, halogen, —OH, —$NH_2$, —NH and/or —SH,
- —OH, —$NH_2$, —NH and/or —SH, with the proviso that $R^9$=H, or that at least one of the $R^6$ to $R^8$ groups is one of the —OH, —$NH_2$, —NH or —SH groups.

As compound $B_t$", it is advantageously possible here, for example, to use one compound or multiple compounds from the following list: 2-dimethylaminethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-β-hydroxyethylmorpholine, 2-dimethylaminoethylamine, 3-dimethylamino-n-propylamine, 2-diethylaminoethylamine, 3-diethylamino-n-propylamine, N-methylpiperazine, imidazole, 2-methylimidazole, 2-ethylimidazole, 2-ethyl-4-methylimidazole, 2-isopropylimidazole, 2-undecylimidazole, 2-octadecylimidazole, 2-phenylimidazole, 2-phenyl-4-methylimidazole, 2-dimethylaminoethanethiol, methimazole, 2-mercaptobenzoimidazole, 2-mercaptobenzothiazole.

The stabilizing component C' serves to increase the storability of the adhesive provided with the epoxy-amine curing agent/accelerator of the A'$B_t$"C' type. It is very advantageous when component C is used in the presence of 0.05 to 5.0 molar equivalents of water per molar equivalent of epoxy groups in component A"; further advantageously, the target ratio of water molecules to epoxy groups of component A' is in the region of 1:1.

Compounds used for the stabilizing component C' are especially advantageously those having two or more active hydrogen atoms in the molecule. In a preferred embodiment, the stabilizing component C' contains either at least one primary amino group ($NH_2$) or at least one hydrazide group ($CONHNH_2$) or at least 2 functional groups selected from OH group, SH group, NH group and COOH group, in the absence of epoxy groups and tertiary amino groups in each case.

Advantageous examples of representatives of the stabilizing component C' are amines having at least two active hydrogen atoms, for example piperazine, aniline, cyclohexylamine; polyfunctional carboxylic acids, such as adipic acid, phthalic acid, 3-[9-(2-carboxyethyl)-2,4,8,10-tetraoxaspiro[5.5]undecan-3-yl]propanoic acid CAS: 3058-05-7; polyvalent thiols, such as 1,2-dimercaptoethane and 2-mercaptoethyl ether; hydrazides, such as phenylacetic hydrazide; amino acids, such as alanine and valine; compounds having 2 or more different functional groups, such as 2-mercaptoethanol, 1-mercapto-3-phenoxy-2-propanol, mercaptoacetic acid, N-methylethanolamine, diethanolamine, hydroxyaniline, N-methyl-o-aminobenzoic acid, anthranilic acid, sarcosine, hydroxybenzoic acid, lactic acid; polyhydric alcohols, such as pentaerythritol, sorbitol, trimethylolpropane, trimethylolethane and tris(2-hydroxyethyl) isocyanurate; polyhydric phenols such as bisphenol A, bisphenol F, bisphenol S, hydroquinone, catechol, resorcinol, benzene-1,2,3-triol, phenol-novolak resins, cresol-novolak resins and bisphenol Anovolak resins.

Further advantageous examples of representatives of the stabilizing compounds C' are carboxylic acids. If the stabilizing component C' comprises a carboxylic acid or is formed exclusively from one or more carboxylic acids, mono- and dicarboxylic acids in particular, and also minor amounts of tricarboxylic acids as occur, for example, as a by-product in dimer fatty acids are used. Suitable monocarboxylic acids may contain 2 to 24, preferably 10 to 18, carbon atoms. These monocarboxylic acids may be saturated or unsaturated. In addition, they may also be branched, and have aromatic and cycloaliphatic rings. Specific examples include caprylic acid, capric acid, stearic acid, and linoleic and linolenic acid.

Suitable dicarboxylic acids are generally those having 3-38, preferably 4-36, carbon atoms. Examples that are advantageously suitable in accordance with the invention include adipic acid, sebacic acid, nonane- and decanedicarboxylic acid, dimer fatty acids, for example Pripol® 1014 (=dimerized fatty acid from Unilever), and aromatic or cycloaliphatic dicarboxylic acids such as phthalic acid and terephthalic acid. It is also possible to use mixtures of the abovementioned carboxylic acids. Preference is given to dimer fatty acids.

Stabilizing compounds C' used for epoxy-amine (co-) curing agents of the A'$B_r$''C' type, especially for those without carboxylic acid groups and without acid hydrazide groups in the compound $B_r$', may advantageously also be carboxylic anhydrides. Carboxylic anhydrides may advantageously be chosen from the list formed from succinic anhydride, phthalic anhydride, tetrahydrophthalic anhydride, methyltetrahydrophthalic anhydride, hexahydrophthalic anhydride, methylhexahydrophthalic anhydride, methyl-5-norbornene-2,3-dicarboxylic anhydride, dodecenylsuccinic anhydride, pyromellitic dianhydride or 5-(2,5-diketotetrahydrofuryl)-3-methyl-3-cyclohexene-1,2-dicarboxylic anhydride.

Typical and advantageously usable examples of compounds available on the market that can be used as latent hardeners or accelerators include epoxy-amine adduct types (amine adduct types), for instance "Ajicure PN-40", "Ajicure PN-50", "Ajicure MY-25", "Ajicure MY-24" (trade names of products produced by Ajinomoto Co., Inc.). Further epoxy-amine adducts are, for example, encapsulated epoxy-amine adduct types "Novacure HX-3742" and "Novacure HX-3721" (trade names of products produced by Asahi Chemical Industry Co., Ltd.).

It is optionally possible to use further stabilizing components, referred to in the context of this document as compounds D or component D. This component is added after preparation of the epoxy-amine adduct, especially together with water; see further up. It especially serves to improve the storage stability of the (co-)curing agent and hence also of the composition to be cured, to which such a (co-)curing agent has been added. It is assumed that the functionality follows a mechanism in which the compound reacts with the surface of particles of the latent (co-)curing agent of the solid dispersion type, in order to modify the latter for the encapsulation. Advantageously suitable examples are borate ester compounds. Typical examples of borate ester compounds suitable in accordance with the invention include trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl) (1,4,7,10,13-pentaoxatetradecyl) (1,4,7-trioxaundecyl)borane, tribenzyl borate, triphenyl borate, trio-tolyl borate, tri-m-tolyl borate and triethanolamine borate. Among these, preference is given to triethyl borate.

As already set out above, accelerators are those chemical compounds which, when used in addition to one or more curing agents, increase the reaction rate of the curing reaction and/or the rate of activation of the curing reaction—compared to the progression in the absence of the accelerator(s). This can be determined by means of DSC. For instance, the reaction peak is shifted to lower temperatures by addition of suitable accelerators.

According to the invention, the curable composition may contain one or more accelerators. The effect of an accelerator is in particular, for instance, that the starting temperature for the crosslinking reaction of the reactive resin and/or the reaction temperature at which the curing reaction proceeds is reduced. This improves handling in the bonding operation. It should be noted here that the starting temperature lowered by the addition of accelerator is associated with a reduced storage stability as a disadvantage, since the lowering of the starting temperature also results in unwanted elevated reaction during storage. Nevertheless, the adhesive tapes of the invention are far superior in terms of storage stability to the prior art prepregs impregnated with epoxy adhesives.

However, if the effect mentioned is to be completely avoided, it is also possible to dispense entirely with accelerators.

Accelerators used may in principle, and particularly advantageously in accordance with the invention, be the compounds as described above as curing agents; the observations made there are correspondingly applicable. In the choice of accelerator, the reactivity thereof is especially advantageously matched with that of the curing agent(s) used, in order to achieve the accelerator effect. For instance, the curing agent(s) may be selected such that the curing reaction proceeds very effectively and/or completely, while the accelerator(s) is/are chosen such that the reaction rate and/or the rate of activation is increased; in particular, the reaction temperature of curing and/or the starting temperature of the curing reaction is lowered.

In a further execution variant of the invention, the curing reagent—in addition to the epoxy-amine adduct(s) as (co-) curing agent(s)—comprises one or more curing agents for the fatty acid-modified epoxy resins ($E_F$) and/or one or more accelerators for the curing reaction of the fatty acid-modified epoxy resins ($E_F$), where these curing agents for accelerators are not epoxy-amine adducts.

Such additional curing agents or accelerators selected may especially advantageously be compounds from the following list: dicyandiamide, anhydrides, blocked or unblocked imidazoles, hydrazides and reaction products of diacids and polyfunctional amines. Examples of useful reaction products of diacids and polyfunctional amines include reaction products of phthalic acid and diethylenetriamine.

In a very preferred execution of the invention, the curing reagent comprises dicyandiamide and one or more epoxy-amine adducts. Even further preferably, the curing reagent consists exclusively of dicyandiamide and one or more epoxy-amine adducts. In combination with dicyandiamide, the one epoxy-amine adduct, or at least one of the epoxy-amine adducts when two or more epoxy-amine adducts are present, thus increases the reaction rate of the curing reaction of the fatty acid-modified epoxy resin compared to the situation in which dicyandiamide is present as the sole component of the curing reagent.

The invention thus further provides an adhesive tape comprising at least one layer of a pressure-sensitive adhesive, where the adhesive comprises a polymeric film former matrix and a curable composition, wherein the curable composition comprises at least one fatty acid-modified epoxy resin ($E_F$) and at least one curing reagent for the fatty acid-modified epoxy resin ($E_F$), and wherein the curing reagent comprises α) at least one epoxy-amine adduct, namely the reaction product of at least one compound A having at least one cyclic ether group in the molecule, and at least one amine compound B, and β) dicyandiamide, or consists of these components α) and β).

Stoichiometric curing agents, for example dicyandiamide, are preferably used on the basis of the amount of epoxide in the adhesive. For this purpose, first of all, the EEW of the epoxy mixture is calculated by the following formula:

$$EEW_{ges} = m_{ges}/\Sigma\frac{m_i}{EEW_i}$$

where $m_{gcs}$=total $m_i$ $m_i$=masses of the individual components individual of the mixture $EEW_i$=epoxy equivalents of components i The amount of curing agent $m_H$ is then found from the amine equivalent of the curing agent (AEW) and the $EEW_{gcs}$ of the epoxy mixture as follows:

$$m_H=AEW*(m_i/EEW_{gcs})$$

The epoxy-amine adducts that act as accelerator are then advantageously used at 0.1 to 10 parts by weight, especially at 0.5 to 5 parts by weight, preferably at 1 to 3 parts by weight, based in each case on 100 parts by weight of the epoxy resin (E) to be cured. In all cases—in particular when the epoxy-amine adduct is a relatively weak accelerator—amounts in the range of 4-8 parts by weight are used.

If, in addition to the epoxy resins (E), other reactive resins are present in the curable composition, it is additionally also possible to add specific curing agents and/or accelerators for reaction with these components.

The curable composition of the invention is preferably an adhesive, especially a pressure-sensitive adhesive.

Adhesives (according to DIN EN 93:2008-06) are non-metallic substances that join joining partners via two-dimensional adhesion and inner strength (cohesion). Adhesives may be self-adhesive and/or develop their ultimate bonding force only via particular activation, for instance via thermal energy and/or actinic radiation. Reactive adhesives (that may be self-adhesive or nonadhesive prior to activation) comprise chemically reactive systems which can lead to a curing reaction via activation and can develop particularly high bonding forces (especially higher than 1 MPa) to the substrates to which they are bonded. The curing or consolidation is achieved through chemical reaction of the reactants with one another. By contrast with pressure-sensitive adhesives that are regularly also crosslinked to increase cohesion, but still have viscoelastic properties even after crosslinking and especially do not undergo any further consolidation after bonding, it is generally only the curing in the case of reactive adhesives that leads to the actual bonding with the desired bonding forces; the adhesive itself is frequently thermoset or largely thermoset after the curing ("paintlike").

The attribute "pressure-sensitively adhesive"—including as a constituent of nouns, as in pressure-sensitive adhesive composition for instance—or synonymously with the attribute "self-adhesive"—likewise also as part of nouns—is understood in the context of this document to refer to those compositions that even under relatively gentle pressure—unless stated otherwise, at room temperature, i.e. 23° C.—permit a lasting bond to the substrate and, after use, can be redetached from the substrate essentially without residue. Pressure-sensitive adhesives are preferably used in the form of adhesive tapes. In the context of the present invention, a pressure-sensitive adhesive tape has a bonding force in the uncured state of at least 1 N/cm. Bonding force is determined here on steel analogously to ISO 29862 (method 3) at 23° C. and 50% relative air humidity at a peel rate of 300 mm/min and a peel angle of 180°. The reinforcing film used is an etched PET film of 36 μm in thickness as obtainable from Coveme (Italy). The bonding of a 2 cm-wide test strip is undertaken here by means of a 4 kg roll applicator at a temperature of 23° C. The adhesive tape is peeled off immediately after application. The measured value (in N/cm) was obtained as the average value from three individual measurements.

Pressure-sensitive adhesives are permanently pressure-sensitive at room temperature, and thus have sufficiently low viscosity and high tackiness to the touch, such that they wet the surface of the particular substrate even at low contact pressure. The bondability of the pressure-sensitive adhesives is based on their adhesive properties, and the redetachability is based on their cohesive properties.

In a preferred manner, the curable composition, especially the pressure-sensitive adhesive, is used in the form of a film, especially as a constituent of an adhesive tape.

The general expression "adhesive tape" thus encompasses firstly a carrier material that has been provided on one or both sides with a (pressure-sensitive) adhesive and may optionally have further intervening layers. Particularly, the expression "adhesive tape" in the context of the present invention includes what are called "transfer adhesive tapes", i.e. adhesive tapes without a permanent carrier, especially single-sided adhesive tapes without permanent carriers.

Such transfer adhesive tapes of the invention are applied to a temporary carrier prior to application. Temporary carriers here are especially flexible materials in film form (polymer films, papers or the like) that have been provided with a separating layer (for example have been siliconized) and/or have antiadhesive properties (called separation materials, liners or release liners).

Temporary carrier is especially serve to make it possible to handle and to protect single-layer or otherwise non-self-supporting adhesive tapes—i.e. especially consisting solely of the (pressure-sensitive) adhesive layer.

The temporary carrier is easily removable and is removed on application (generally after application of the free adhesive tape surfaced to the first substrate and before bonding of the other, initially covered adhesive tape surface to the second substrate), such that the adhesive layer can be utilized as a double-sided adhesive tape.

Prior to application, transfer adhesive tapes of the invention may also have two temporary carriers between which the adhesive is present as a layer. For application, it is then regularly the case that one liner is first removed, the adhesive composition is applied and then the second liner is removed. The adhesive composition can thus be used directly for bonding of two surfaces. Such carrier-free transfer adhesive tapes are particularly preferred in accordance with the invention. Such a pressure-sensitive carrier-free transfer adhesive tape of the invention enables very exact bonding in terms of positioning and dosage.

Also possible are adhesive tapes in which there are not two liners but instead a single double-sidedly separating liner. In that case, the adhesive tape web is covered on its top side by one side of a double-sidedly separating liner and on its bottom side by the reverse side of the double-sidedly separating liner, especially of an adjacent winding in a bale or a roll.

Adhesive tapes coated with adhesives on one or both sides are usually wound at the end of the production process to give a roll in the form of an Archimedean spiral or in cross-wound form. In order to prevent the adhesives from coming into contact with one another in the case of double-sided adhesive tapes, or in order to prevent the adhesive from sticking to the carrier in the case of single-sided adhesive tapes, the adhesive tapes, if not already present on a liner, may advantageously be covered with a liner on one or both sides prior to winding, which is wound up together with the adhesive tape. As well as the covering of single- or double-sided adhesive tapes, liners are also used to cover pure adhesives (transfer adhesive tape) and adhesive tape sections (for example labels). This liner additionally ensures that the adhesive is not soiled prior to use.

One embodiment of a single-adhesive tape in particular comprises a polymeric film former matrix M including the curable composition comprising at least one epoxy resin E and at least one curing reagent HR for the epoxy resin E. Such adhesive tapes thus comprise an adhesive film fundamentally formed from a polymeric film-forming matrix (referred to as “film former matrix” for short in the context of this document) with the curable composition embedded therein as reactive adhesive. The film former matrix here especially forms a self-supporting three-dimensional film (with the spatial extent in thickness direction of the film generally being very much smaller than the spatial extents in longitudinal and transverse direction, i.e. than in the two spatial directions of the two-dimensional extent of the film; with regard to the meaning of the term “film” see also further down). The reactive adhesive is preferably distributed in this film former matrix essentially in a spatially equally distributed (homogeneous) manner, especially such that the reactive adhesive—that possibly would not be self-supporting without the matrix—assumes essentially the same (macroscopic) spatial distribution in the adhesive film of the invention as the film former matrix.

The function of this matrix is to form an inert skeleton for the reactive monomers and/or reactive resins, such that they are intercalated in a film or foil. It is thus also possible for otherwise liquid systems to be supplied in film form. In this way, easier handling is ensured. The parent polymers of the film former matrix, by virtue of sufficient interactions of the macromolecules, are capable of forming a self-supporting film, for example—without wishing to unnecessarily restrict the concept of the invention thereby—by formation of a network on account of physical and/or chemical crosslinking.

What is meant by “inert” in this context is that the reactive monomers and/or reactive resins, under suitably chosen conditions (for example at sufficiently low temperatures), essentially do not react with the polymeric film former matrix.

Suitable film former matrices for use in the present invention preferably include a thermoplastic homopolymer or a thermoplastic copolymer (referred to collectively in the context of this document as “polymers”), or a blend of thermoplastic homopolymers or thermoplastic copolymers or of one or more thermoplastic homopolymers with one or more thermoplastic copolymers. In a preferred procedure, wholly or partly semicrystalline thermoplastic polymers are used.

Thermoplastic polymers chosen may, for example, be polyesters, copolyesters, polyamides, copolyamides, polyacrylic esters, acrylic ester copolymers, polymethacrylic esters, methacrylic ester copolymers, thermoplastic polyurethanes, and chemically or physically crosslinked substances of the aforementioned compounds. The polymers mentioned may each be used as a polymer used on its own or as a component of a blend.

In addition, elastomers and—as representatives of the thermoplastic polymers already mentioned—thermoplastic elastomers are also conceivable as polymeric film former matrix, on their own or in a mixture. Preference is given to thermoplastic elastomers, especially semicrystalline thermoplastic elastomers. The elastomers mentioned—especially thermoplastic elastomers—may each be used as a polymer used on its own or as a component of a blend, for example with elastomers and/or thermoplastic elastomers and/or other thermoplastic elastomers, for example those representatives mentioned in the paragraph above.

Particular preference is given to thermoplastic elastomers having softening temperatures less than 100° C. In this connection, the term “softening temperature” represents the temperature from which the thermoplastic pellets stick to each other. If the constituent of the polymeric film former matrix is a semicrystalline thermoplastic polymer, it very preferably has, as well as its softening temperature (which is connected to the melting of the crystallites), a glass transition temperature of not more than 25° C., preferably not more than 0° C.

In a preferred embodiment of the invention, a thermoplastic polyurethane is used. The thermoplastic polyurethane preferably has a softening temperature of less than 100° C., especially less than 80° C.

In a particularly preferred embodiment of the invention, Desmomelt 530® is used as polymeric film former matrix, commercially available from Bayer Material Science AG, 51358 Leverkusen, Germany. Desmomelt 530® is a hydroxy-terminated, largely linear, thermoplastic, highly crystallizing polyurethane elastomer.

According to the invention, the amount of the polymeric film former matrix within a reactive adhesive film is in the range from about 20% to 80% by weight, preferably about 30% to 50% by weight, based on the total amount of polymers in the polymeric film former matrix and reactive resins in the curable composition. Most preferred is 35% to 45% by weight, preferably about 40% by weight, of the polymeric film former matrix.

After curing, the curable composition may—as adhesive or in nonadhesive form—be beneficial wherever thermosets are used. For this purpose—in accordance with the above remarks relating to the adhesive tape—it is possible to utilize a shape former matrix with the reactive adhesive present therein. The shape former matrix can assume the desired three-dimensional form; the film former matrix mentioned for the adhesive tapes thus constitutes a particular execution of such a shape former matrix in which the three-dimensional extent takes the form of a layer.

Shape former matrices may be formed, for example, by foams, porous materials, textile materials or like, especially also be implemented as already described for the film former matrix.

Preparation Processes

The adhesives used in accordance with the invention can in principle be prepared by the processes known to the person skilled in the art.

A very gentle process by which it is possible to process even raw materials that are difficult to process, such as non-thermoplastic elastomers—for example nitrile rubbers—is extrusion, especially using a planetary roll extruder. It is possible thereby even to incorporate the sensitive components of the curable composition, such as reactive resins and curing agents, without prior reaction of these components or other problems in the process. Such a prior reaction would already cure or at least partly cure the adhesive tape and be at odds with the aim of a storable transportable adhesive tape which is to be cured only after application.

"Non-thermoplastic" substances or compositions in the context of the present document refer particularly to those that do not show thermoplastic behavior on heating to a temperature of 150° C., preferably on heating to a temperature of 200° C., very preferably on heating to a temperature of 250° C., especially such that they are not considered to be thermoplastic in the thermoplasticity test (see Experimental).

The term 'nitrile rubber', as usual, represents 'acrylonitrilebutadiene rubber', NBR for short, and refers to synthetic rubbers that are obtained by copolymerization of acrylonitrile and butadiene in mass ratios of about 10:90 to 52:48 (acrylonitrile:butadiene).

Planetary roll extruders as a continuously operating unit have been known for some time and were first used in the processing of thermoplastics, for example PVC, where they were used mainly for charging of the downstream units, for example calenders or roll systems. Their advantage of high surface renewal for material and heat exchange, with which the energy introduced via friction can be removed rapidly and effectively, and of short residence time and narrow residence time spectrum, has allowed their field of use to be broadened recently to processes including compounding processes that require a mode of operation with exceptional temperature control.

Planetary roll extruders consist of multiple parts, namely a revolving central spindle, a housing that surrounds the central spindle at a distance and has inner teeth and planetary spindles that revolve in the cavity between central spindle and internally toothed housing like planets around the central spindle. Where reference is made hereinafter to inner teeth of the housing, this also includes a multipart housing with a bushing that forms the inner teeth of the housing. In the planetary roll extruder, the planetary spindles mesh both with the central spindle and with the housing that has teeth on the inside. At the same time, the planetary spindles slide against a stop ring by their end that points in conveying direction. Planetary roll extruders, compared to all other designs of extruder, have extremely good mixing action but much lower conveying action.

Planetary roll extruders exist in various designs and sizes according to the manufacturer. According to the desired throughput, the diameters of the roll cylinders are typically between 70 mm and 400 mm.

Planetary roll extruders generally have a filling section and a compounding section.

The filling portion, generally corresponding to a filling zone, consists of a conveying screw onto which all the solid-state components—in the present case especially the non-thermoplastic elastomers and any further components—are metered continuously. The conveying screw then transfers the material to the compounding section. The region of the filling section with the screw is preferably cooled in order to avoid caking of material on the screw. But there are also embodiments without a screw section, in which the material is applied directly between central and planetary spindles. However, this is of no significance for the efficacy of the process of the invention. The central spindle can preferably also be cooled.

The compounding section typically consists of a driven central spindle and several planetary spindles that rotate around the central spindle within a roll cylinders having internal helical gearing. The speed of the central spindle and hence the peripheral velocity of the planetary spindles can be varied and is thus an important parameter for control of the compounding process. The compounding portion may be formed by a single compounding cell or by a sequence of multiple, mutually separated compounding zones, separated especially by stop rings and possibly additional injection or dispersing rings. The number and arrangement of the planetary spindles may vary from compounding zone to compounding zone. Typically, the compounding portion will preferably consist at least of two, but more preferably of three or four, coupled roll cylinders, with each roll cylinder having one or more separate temperature control circuits.

The surrounding housing has a jacket, in a contemporary design. The inner shell is formed by a bushing provided with internal teeth. Provided between inner shell and outer shell is the important cooling of the planetary roll extruder.

The planetary spindles do not require guiding in circumferential direction. The teeth ensure that the separation of the planetary spindles in circumferential direction remains the same. This can be referred to as self-guiding.

The materials are circulated between the central and planetary spindles, i.e. between planetary spindles and the helical gearing of the roll section, such that the materials are dispersed under the influence of shear energy and external temperature control to give a homogeneous compound.

The number of planetary spindles that rotate in each roll cylinder can be varied and hence adapted to the demands of the process. The number of spindles affects the free volume within the planetary roll extruder and the residence time of the material in the process, and additionally determines the size of the area for heat and material exchange. The number of planetary spindles affects the compounding outcome via the shear energy introduced. Given a constant roll cylinder diameter, it is possible with a greater number of spindles to achieve better homogenization and dispersion performance, or a greater product throughput. For achievement of a good ratio of compounding quality to product rate, at least half or even at least ¾ of the possible number of planetary spindles should be used.

The maximum number of planetary spindles that can be installed between the central spindle and roll cylinder is dependent on the diameter of the roll cylinder and on the diameter of the planetary spindles used. In the case of use of greater roll diameters as necessary for achievement of throughputs on the production scale, or smaller diameters for the planetary spindles, the roll cylinders can be equipped with a greater number of planetary spindles. Typically, up to seven planetary spindles are used in the case of a roll diameter of D=70 mm, while ten planetary spindles, for example, can be used in the case of a roll diameter of D=200 mm, and 24, for example, in the case of a roll diameter of D=400 mm.

It will be appreciated that each roll cylinder may be equipped differently with regard to the number and type of planetary spindles and hence be matched to the respective formulation-related and process-related demands.

According to the invention, it has been possible to provide storage-stable curable epoxy-based compositions that are of excellent suitability as adhesives in adhesive tapes and with which it is suitable to create even very thick adhesive tapes. The products produced have very good adhesion, especially to glass surfaces. By virtue of the components chosen, it has been possible to reduce or entirely avoid solubility of the curing agents used in the other components, which affords very storage-stable products that have good transportability and storability and ensure their full bonding performance even on customer employment—even after prolonged storage time.

The curing of the adhesives or adhesive tapes of the invention after application can advantageously be affected at temperatures between 120° C. and 200° C. for 10 to 120 minutes. The exact conditions are guided by the curing agent used and any accelerator used and the amount of accelerator used. Typically, accelerators are used between 0.5 phr and 5 phr, with phr relating to the amount of epoxy resins used. Illustrative curing conditions are 30 minutes at 180° C., 30 minutes at 160° C., 35 minutes at 145° C., 60 minutes at 130° C., 120 minutes at 120° C.

According to the invention, it is possible to create very thick adhesive tapes. The presentation of intrinsically highly viscous adhesives in the form of stable films—for instance by the embedding of the reactive adhesive into a polymeric film former matrix—with the adhesives of the invention opens up access to very storage-stable adhesive films in a wide variety of dimensions.

For instance, it is possible to offer adhesive films in very thin form—for example from a thickness of a few μm—through customary adhesive tape thicknesses, for instance with adhesive layers of thickness 25 μm up to 100 μm—for instance 50 μm-thick adhesive layers, up to adhesive tapes having very thick adhesive layers of more than 100 μm, preferably of more than 200 μm, even of 300 μm or more, 500 μm or more, 1 mm or more, up to adhesive layers in the region of a few millimeters and even centimeters.

The general expression "adhesive tape" encompasses a carrier material provided with an adhesive on at least part of one or both sides. The carrier material includes any flat structures, for example sections elongated in two dimensions, tapes having extended length and limited width, tape sections, die-cut parts (for example in the form of edges or boundaries of an arrangement to be bonded), other shaped articles, multilayer arrangements and the like.

For particular applications, it may be desirable for one or both sides of the adhesive tape not to be provided completely with adhesive, but for partly adhesive-free regions to be provided.

Adhesive tapes coated with adhesives on one or both sides are usually wound at the end of the production process to give a roll in the form of an Archimedean spiral or in cross-wound form. In order to prevent the adhesives from coming into contact with one another in the case of double-sided adhesive tapes, or in order to prevent the adhesive from sticking to the carrier in the case of single-sided adhesive tapes, the adhesive tapes may advantageously be covered with a liner on one or both sides prior to winding, which is wound up together with the adhesive tape.

In one embodiment of the invention, the elongated article is a cable harness comprising a bundle of multiple cables, such as 3 to 1000 cables, preferably 10 to 500 cables, especially between 50 and 300 cables.

Carriers used may be any known films and textile carriers such as loop-drawn knits, scrims, tapes, braids, tufted textiles, felts, weaves (including plain weave, twill weave and satin weave), loop-formed knits (including warp-knitted fabric and knitwear fabric) or nonwovens, with "nonwoven" being understood to mean at least textile fabrics according to EN 29092 (1988) and also stitch-bonded fiber webs and similar systems. A particularly advantageous adhesive tape is one in which the carrier used is a weave, a nonwoven or a knit. Such carriers are described, for example, in WO 2015/004190 A1, to which full reference is made here.

In addition, it is possible to use spacer weaves and knits with lamination. Such spacer weaves are disclosed in EP 0 071 212 Bl. Spacer weaves are mat-shaped layered products having a top layer composed of a fibrous or filamentous web, a bottom layer and, between these layers, individual or bushels of holding fibers needled through the particle layer in a distributed form across the area of the layered product to join the top and bottom layers together.

Particularly useful as nonwoven materials are consolidated staple fiber webs, but also filament, meltblown and spunbonded webs, which usually have to be consolidated additionally. Known possible consolidation methods for nonwovens are mechanical, thermal and chemical consolidation. Particularly advantageous nonwovens have been found to be those that have especially been consolidated by overstitching with separate filaments or by interlooping. Consolidated nonwovens of this type are produced, for example, on stitch-bonding machines of the "Malimo" type from Karl Mayer, formerly Malimo, and can be sourced from Hoftex Group AG inter alia.

The carrier used may also be a nonwoven of the Kunit or Multiknit type. A Kunit nonwoven is characterized in that it originates from the processing of a longitudinally oriented fiber web into a sheetlike structure which has the loops on one side, and, on the other, loop feet or pile fiber folds, but possesses neither threads nor prefabricated sheetlike structures. A nonwoven of this kind has also long been produced, for example, on stitch-bonding machines of the "Malimo" type from Karl Mayer.

A Multiknit nonwoven is characterized in relation to the Kunit nonwoven in that the nonwoven is consolidated on both the top and bottom sides by the double-sided needlepunching. Starting materials used for a Multiknit are generally one or two single-sidedly interlooped pile fiber nonwovens produced by the Kunit method. In the end product, the two top sides of the nonwoven are shaped by interlooped fibers to form a continuous surface and bonded to one another by fibers virtually at right angles to one another. It is possible to additionally introduce further needle-penetrable fabric and/or scatterable media.

Finally, stitchbonded webs are also suitable as a precursor for forming a carrier of the invention and an adhesive tape of the invention. A stitchbonded web is formed from a nonwoven material with a multitude of threads running parallel to one another. These threads arise from the stitching-in or stitchbonding of continuous textile filaments. For this type of nonwoven, stitchbonding machines of the "Malimo" type from Karl Mayer are known.

Needlefelt webs are also particularly suitable. In needlefelts, a tuft of fibers is made into a fabric with the aid of barbed needles. By repeatedly inserting and pulling out the needles, the material is consolidated on a needle bar, with the individual fibers being interlooped to form a fixed fabric.

Also particularly advantageous is a staple fiber web which has been preconsolidated in the first step by mechanical processing, or which is a wetlaid web that has been laid hydrodynamically, with between 2% by weight and 50% by weight of the fibers of the web being fusible fibers, especially between 5% by weight and 40% by weight of the fibers of the web. Such a web is characterized in that the fibers are wetlaid or, for example, a staple fiber web is preconsolidated by the formation of loops from fibers of the web by needling, stitching, airjet and/or waterjet processing. In a second step, thermosetting is effected, with the strength of the web being increased once again by the melting or partial melting of the fusible fibers.

Advantageously and at least in some regions, the carrier has a polished surface on one or both sides, preferably a fully polished surface on each side. The polished surface may have been chintzed, as elucidated, for example, in EP 1 448 744 A1. In this way, soil repellency is improved.

Starting materials used for the carrier are especially (synthetic) fibers (staple fibers or continuous filament) of synthetic polymers, also called synthetic fibers, made of polyesters such as polyethylene terephthalate, polyamide, polyimide, aramid, polyolefin, polyacrylonitrile or glass, (synthetic) fibers of natural polymers such as cellulosic fibers (viscose, Modal, Lyocell, Cupro, acetate, triacetate, Cellulon), such as rubber fibers, such as plant protein fibers and/or such as animal protein fibers and/or natural fibers of cotton, sisal, flax, silk, hemp, linen, coconut or wool. But the present invention is not limited to the materials mentioned; instead, it is possible, as is apparent to the person skilled in the art without having to exercise inventive skill, to use a multitude of further fibers for production of the web.

Likewise additionally suitable are yarns manufactured from the raw materials specified. In the case of weaves or scrims, it is possible to produce individual filaments from a mixed yarn, i.e. having synthetic and natural constituents. In general, however, the warp threads and the weft threads are each formed from one type of material.

The material used for the carrier is preferably polyester, on account of the excellent aging resistance and excellent media resistance with respect to chemicals and operating media such as oil, gasoline, antifreeze and the like. Furthermore, polyester has the advantage that they lead to a very abrasion-resistant and thermally stable carrier, which is of particular importance for the specific end use for bundling of cables in automobiles and in the engine compartment, for example. In one embodiment of the invention, the carrier used is a PET nonwoven or a PET weave.

Advantageously, the basis weight of the textile carrier is between 30 $g/m^2$ and 300 $g/m^2$, further advantageously between 50 $g/m^2$ and 200 $g/m^2$, particularly advantageously between 50 $g/m^2$ and 150 $g/m^2$, very particularly advantageously between 70 $g/m^2$ and 130 $g/m^2$.

In a particularly advantageous embodiment of the invention, the carrier used is a weave or nonwoven made of polyester that has a basis weight between 50 $g/m^2$ and 150 $g/m^2$.

Advantageously, the coatweight of the binder applied to the carrier and/or introduced into the carrier is between 30 $g/m^2$ and 500 $g/m^2$, further advantageously between 40 $g/m^2$ and 400 $g/m^2$, particularly advantageously between 50 $g/m^2$ and 300 $g/m^2$.

The introduction into the carrier, especially into a nonwoven or woven carrier, can be effected, for example, by extrusion coating of the carrier with the thermally curable composition.

The processing temperature of the carrier coated with the adhesive and the thermally curable adhesive layer should not exceed 60° C. in the course of drying, in order to prevent premature reaction. The same applies to the storage temperature.

The ready-coated material is preferably cut into a width of 20±2 mm (any other width is likewise conceivable) and wound in spiral form around the bundle of cables that has been brought into shape with an overlap of 50%. For the activation of the thermally curable adhesive layer, a thermal treatment at 110° C. for 10 min is necessary. The thermal treatment can be effected by means of a hot air gun, IR source, oven, heating jacket, or the like.

In a preferred embodiment of the invention, the adhesive, after application to the carrier, has sunk into the carrier to an extent of more than 10%, preferably to an extent of more than 25%, further preferably to an extent of more than 50%. What is meant here by a numerical value of 25%, for example, is that the adhesive has penetrated over a layer thickness of 25% of the thickness of the textile carrier, i.e. over a layer thickness of 25 μm within a carrier having a thickness of 100 μm, beginning from the surface of the carrier on which the adhesive has been coated, and at right angles to the plane formed by the longitudinal/cross direction.

The ready-coated material is preferably provided with a protective film.

The present invention provides a method of jacketing elongate items, such as conduits or cable looms in particular, wherein an adhesive tape is run in a helical line around the elongate item or the elongate item is wrapped by the adhesive tape in axial direction, the elongate item together with the wrapping adhesive tape is put in the desired arrangement, especially in the cable loom map, the elongate item is held in this arrangement, the curable adhesive is made to cure by the supply of heat at a temperature of up to 110° C., preferably between 60° C. and 110° C. Preference is given to supplying the thermal energy over a period of 0.5 sec to 10 min, preferably 2 min to 6 min, which is compatible with the cycle times of the manufacturing process, such that the elongate item has fully cured as soon as it is installed in the target object, such as automobiles, watercraft or aircraft.

The tape is preferably wound around the elongate item in a spiral with an overlap of 30% to 70%, more preferably 40% to 50%, especially about 50%.

Finally, the present invention also relates to a cable harness wrapped with the cured adhesive tape and to a cable harness produced by the method of the invention.

Figure 2:
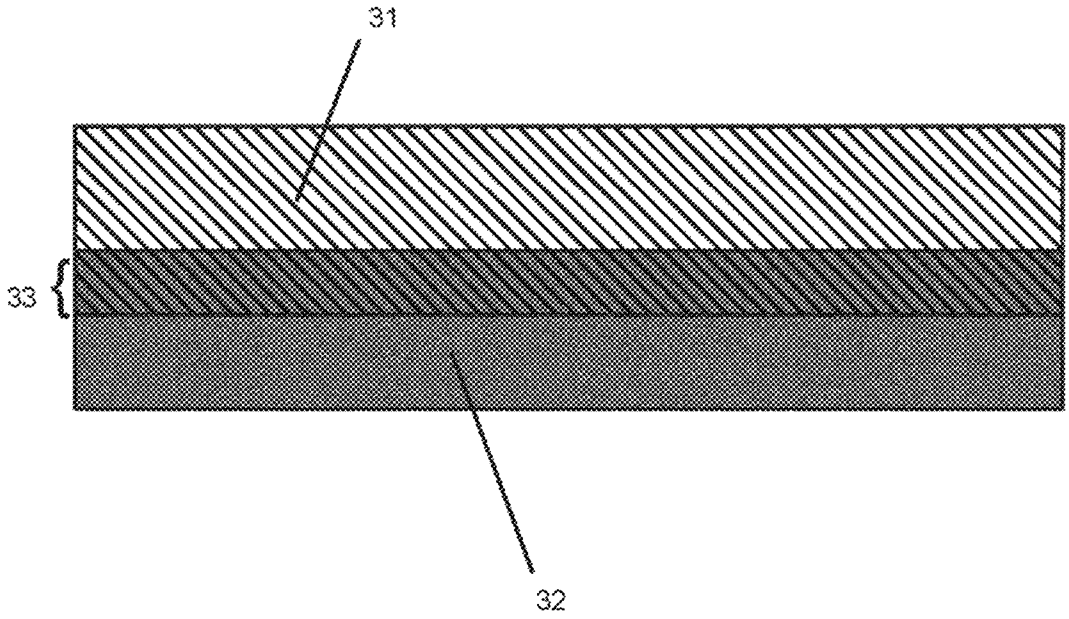
FIG. 2 is a cross-section of one embodiment of an adhesive tape of the present invention.
Figure 3:
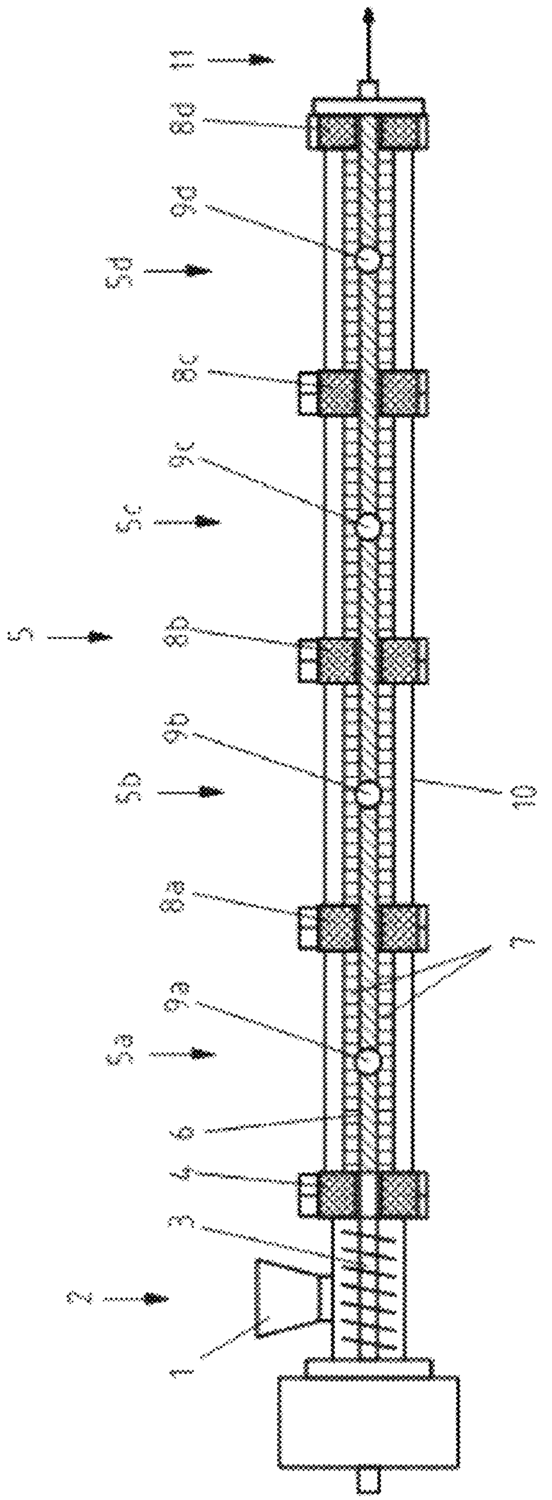
FIG. 3 is a side view of an planetary roller extruder configuration used in the examples.
Figure 4:
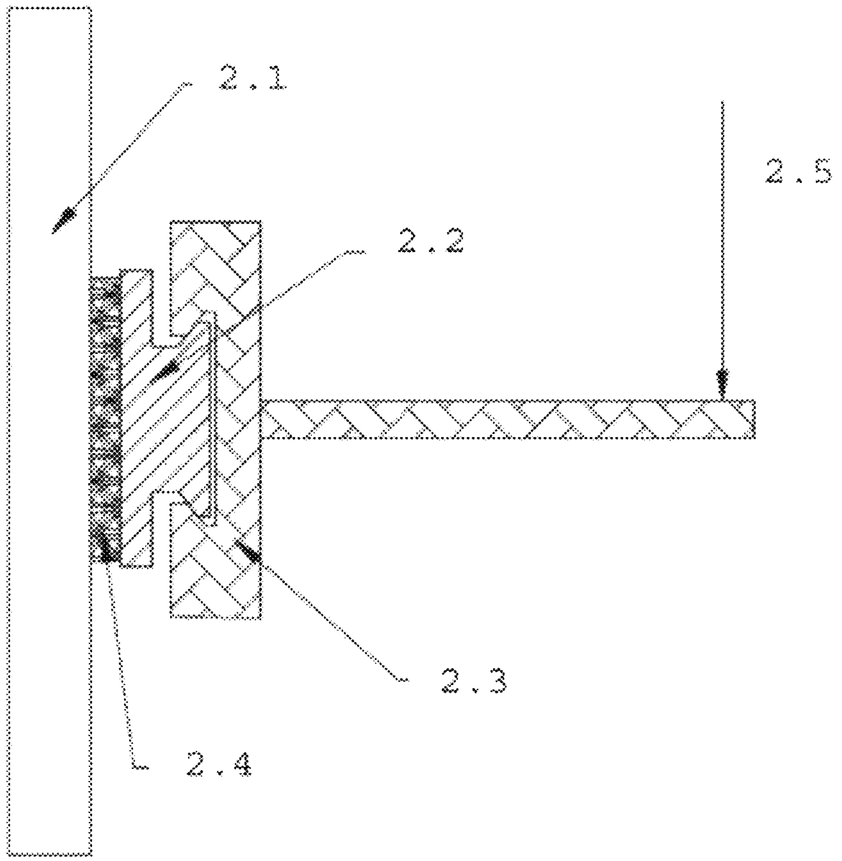
FIG. 4 is a schematic illustrating an apparatus for conducting a tip shear test.

FIG. 2 shows, in a section in cross direction (cross section), the adhesive tape consisting of a nonwoven carrier 31 to which a layer of a curable adhesive 32 has been applied on one side, which is additionally self-adhesive.

The adhesive has sunk into the carrier to an extent of 25% (33), which results in optimal anchoring.

Likewise encompassed by the concept of the invention are a jacketed elongate item, such as a cable harness in particular, jacketed with an adhesive tape of the invention, and a vehicle comprising such a wrapped elongate item.

Test Methods

The following test methods were used to briefly characterize the specimens produced:

Viscosity

A measure of the flowability of the fluid coating material is dynamic viscosity. Dynamic viscosity is determined to DIN 53019. A viscosity of less than $10^8$ Pa·s is described as fluid. Viscosity is measured in a cylindrical rotary viscometer with a standard geometry according to DIN 53019-1 at a measurement temperature of 23° C. and a shear rate of 1 $s^{-1}$.

Molar Mass

Figures for number-average molar mass Mn or for weight-average molar mass Mw are based on measurement by means of gel permeation chromatography (GPC) as follows:

The eluent used was THF (tetrahydrofuran) with 0.1% by volume of trifluoroacetic acid. The measurement was made at 25° C. The precolumn used was PSS-SDV, 5μ, $10^3$ Å, ID 8.0 mm×50 mm. Columns used for separation were PSS-SDV, 5μ, $10^3$ and also $10^5$ and $10^6$, each with ID 8.0 mm×300 mm. The sample concentration was 4 g/l; the flow rate was 1.0 ml per minute. Measurement was effected against polystyrene standards.

Softening Temperatures of Polymers/Resins

The softening temperature, unless stated otherwise in the individual case, is determined by the standard methodology, which is known as the Ring and Ball method and is standardized in ASTM E28.

The softening temperature is determined using a Herzog HRB 754 Ring and Ball tester. The samples to be analyzed—for instance the resin or elastomer—are first finely crushed by mortar and pestle. The resulting powder is introduced into a brass cylinder open at the base (internal diameter in the upper part of the cylinder 20 mm, diameter of the base opening of the cylinder 16 mm, height of the cylinder 6 mm) and melted on a hot stage. The filling volume is chosen such that the sample after melting fills the cylinder fully without excess.

The resulting specimen together with the cylinder is placed into the sample holder of the HRB 754. The equilibration bath is filled with glycerol if the softening temperature is between 50° C. and 150° C. At lower softening temperatures, it is also possible to work with a water bath. The test balls have a diameter of 9.5 mm and weigh 3.5 g. In accordance with the HRB 754 procedure, the ball is arranged above the test specimen in the equilibration bath and placed onto the test specimen. 25 mm beneath the base of the cylinder is a collector plate, and 2 mm above the base is a light barrier. During the measurement process, the temperature is increased at 5° C./min. In the temperature range of the softening temperature, the ball begins to move through the base opening of the cylinder until it finally comes to rest on the collector plate. In this position, it is detected by the light barrier and the temperature of the equilibration bath at this time is registered. A double determination takes place. The softening temperature is the average from the two individual measurements.

Further reference methods are apparent from the test methods in the experimental.

EXPERIMENTAL

In some examples of the experimental, a planetary roll extruder from ENTEX Rust&Mitschke was used. The planetary roll extruder configuration which is used in the examples is shown by FIG. 1; the figure simultaneously serves to illustrate the basic construction of a planetary roll extruder by way of example.

The planetary roll extruder has a filler section (2) and a compounding section (5), consisting of four roll cylinders (5*a* to 5*d*) in sequence, each corresponding to a compounding zone. The roll cylinder 5*a* corresponds here to the first compounding zone. Within a roll cylinder, the planetary spindles (7) driven by the revolution of the central spindle (6) exchange the materials between central spindle (6) and planetary spindles (7), or between planetary spindles (7) and the wall (10) of the roll cylinder (5*a* to 5*d*).

At the end of each roll cylinder (5*a* to 5*d*) is a stop ring (8*a* to 8*d*) that holds the planetary spindles (7) in a fixed manner.

Via the fill opening (1), it is possible to dose components, for example elastomers, fillers, antioxidants etc., onto the conveying screw (3) of the filler section (2) of the planetary roll extruder. The conveying screw (3) then transfers the materials to the central spindle (6) of the first roll cylinder, i.e. the first compounding zone (5*a*). For improvement of the material intake between central spindle (6) and planetary spindles (7), four long and three short planetary spindles (7) are used in the first roll cylinder (5*a*) in the experiments; other arrangements are also implementable in general.

The internally hollow conveying screw (3) and central spindle (6) are connected to one another in a force-fitting manner and have a common temperature control circuit. Each roll cylinder (5*a* to 5*d*) of the compounding section (5) has independent temperature control. A further temperature control circuit can be used to cool the filler section (2). The temperature control medium used may be water.

The dosage, especially of the epoxy resins used for digestion, but also other components, may be effected, for example, via the injection ring (4) upstream of the first roll cylinder (5*a*) or via the stop rings (8*a* to 8*d*) provided with holes or in a combination of the two options. The roll cylinders (5*a* to 5*d*) are provided with an opening for lateral feeding in about the middle of the cylinders. These can be used, if required, to add liquid or solid components—such as further reactive resins and crosslinkers in particular—via lateral feeders (9*a* to 9*d*).

The temperature of the pressure-sensitive adhesive is ascertained by means of probes in the product outlet (11).

Storability

The storability (Lf) of the adhesive tapes was determined via DSC. For this purpose, the heat of reaction of specimens that have been stored for 10 d at 40° C. ($\Delta H_{10d40}$) and for 10 d at 60° C. ($\Delta H_{10d60}$) was determined and expressed in comparison to the heat of reaction of a freshly produced specimen ($\Delta H_{fresh}$).

$$Lf_{40}=\Delta H_{10d40}/\Delta H_{fresh} \text{ and}$$

$$Lf_{60}=\Delta H_{10d60}/\Delta H_{fresh}$$

The storability thus corresponds to the percentage residual reactivity of the reactive adhesive tapes. In some cases, the heat of reaction measured for the stored samples was minimally greater than that of the fresh specimen. In these cases, storability is set to 1.

Tip Shear Test

A steel mold (2.2) with a flat base in the form of a plate; edge length about 2.5 cm×2 cm; and shaped on the other side for securing of a lever (2.3), said mold having first been provided with a 2.0 cm×2.0 cm and 500 μm-thick adhesive layer (2.4) on the flat base, is stuck onto a glass substrate (2.1) in a blister-free manner, and pressed on with a 2 kg weight for one minute. The adhesive (2.4) is cured at 145° C. within 30 minutes; this was followed by storage under hot and moist conditions in a climate-controlled cabinet at 65° C. and 90% RH. The tip shear test was assessed in a Zwick tensile tester with a 20 kN test head. For this purpose, a lever (2.3) is secured to the bonded steel mold (2.2), as shown in FIG. 2. The machine pushes the lever downward (pressure illustrated by arrow 2.5) until the glass-steel bond fails.

The result of the measurement is the fracture profile. Adhesive (A) means that the adhesive (2.4) has been removed without residue from the glass plate (2.2). Cohesive (C) means that residues of the adhesive (2.4) are to be found both on the flat base of the steel mold (2.2) and on the glass substrate (2.1).

Thermoplasticity

Thermoplasticity/non-thermoplasticity was determined on a laboratory hotplate from Ikamag. A square steel plate corresponding to the specification of ISO 29862:2007, section 5.3.3, was placed onto the hotplate, but with an edge length such that the hotplate was completely covered, and a thickness of 1.1 mm. The temperature of the surface of the steel plate remote from the hotplate is measured with a temperature sensor. The polymer to be tested (a cube of height, width, depth about 2 cm×2 cm×2 cm), or an aggregate of pellets in the case of pellets, was placed onto the middle of the free surface of the steel plate.

Three test series each with identical specimens of the polymer to be tested were run, in which the steel plate in one test series was heated to a temperature of 150° C., in the second test series to a temperature of 200° C., and in the third test series to a temperature of 250° C. (heating rate in each case about 1° C. per second, determination of the temperature by means of the temperature sensor). The sample was kept at the particular end temperature for 1 minute, and then the steel plate was tilted to an angle of 600 (based on the planar, horizontal base).

The sample measured is considered to be non-thermoplastic at least up to the respective temperature if it falls/rolls off the plate of its own accord on tilting.

The sample measured is considered to have a thermoplastic behavior even below a particular temperature if it sticks to the plate for at least 2 seconds at the respective temperature in the test—and hence has adapted by at least partial melting, i.e. if it does not fall/roll off the plate of its own accord within a period of 2 seconds.

Softening Point of the Accelerators

A melting point analyzer was used. For this purpose, the accelerator is introduced into a capillary and heated at a heating rate of 20 K/min. A magnifying glass can be used to visually determine the softening point. For epoxy-amine adducts, the lower temperature limit chosen is that at which the powder noticeably begins to change shape.

Raw Materials Used:

Breon N41H80 Hot-polymerized nitrile-butadiene rubber having an acrylonitrile content of 41% by weight and a Mooney viscosity of 70 to 95. Non-thermoplastic up to 250° C. according to test method for thermoplasticity. Manufacturer/supplier: Zeon Chemicals.

Araldite ECN 1273 Solid epoxy-cresol novolak having a softening temperature of 68 to 78° C. and an EEW of 217 to 233 g/eq. Manufacturer/supplier: Huntsman.

Araldite GT7072 Solid difunctional bisphenol A/epichlorohydrin epoxy resin having an EEW of 570 to 595 g/eq and a softening temperature of 82 to 90° C. Manufacturer/supplier: Huntsman.

Epon 828 Difunctional bisphenol A/epichlorohydrin liquid epoxy having a weight per epoxy of 185 to 192 g/eq. Viscosity at 25° C. of 12 to 14 Pa s. Manufacturer/supplier: Momentive.

Struktol PolyDis 3611 (=Struktol PD3611) Nitrile rubber-modified epoxy resin based on bisphenol F diglycidyl ether having an elastomer content of 40% by weight and a weight per epoxy of 550 g/eq. Viscosity at 25° C. of 10 000 Pa s. Manufacturer/supplier: Schill+Seilacher.

Reactive resin 1 Commercial fatty acid-modified epoxy resin from Kukdo ("KSR-177") with an epoxy equivalent of 190-220 g/eq, a viscosity at 25° C. of 9-15 Pa s and a Gardener color of not more than 5.0 for improving adhesion to glass and metals, for example.

Reactive resin 2 Fatty acid-modified epoxy resin prepared from Epon 828 and Sylfat FA1. The reaction product was blended with Epon 828 and adjusted to an EEW of 200 g/eq.

Dyhard 100S Latent curing agent for epoxy systems, consisting of micronized dicyandiamide in which 98% of the particles are smaller than 10 µm. Manufacturer/supplier: AlzChem.

Ajicure PN-40 Epoxy-imidazole adduct having a softening temperature of 105° C. to 125° C. (a batch with 107° C. was used) and an average particle size of 6 to 16 µm. Manufacturer/supplier: Ajinomoto. According to the safety data sheet, it is a reaction product of an epoxy resin, an imidazole and a carboxylic acid.

Ajicure PN-50 Epoxy-imidazole adduct having a softening temperature of 100° C. to 125° C. (a batch with 116° C. was used) and an average particle size of 7.5 to 16.5 µm. Reaction product of an epoxy resin, an imidazole and a carboxylic acid (according to manufacturer's safety data sheet). Manufacturer/supplier: Ajinomoto.

Ajicure MY-25 Reaction product of an amine and an epoxy resin (epoxy-amine adduct) having a softening temperature of 110° C. to 150° C. (a batch with 128° C. was used) and an average particle size of 7.5 to 17.5 µm. Manufacturer/supplier: Ajinomoto.

Ancamine 2014FG Modified aliphatic polyamine adduct. 90% of the particles are smaller than 6 µm. The softening point is below 100° C. Manufacturer/supplier: Airproducts.

Technicure LC-80 Encapsulated modified imidazole having a softening temperature of 90 to 110° C. A batch with 100° C. was used. According to the distributor (Brenntag), it is an imidazole, epoxy amine adduct. Manufacturer/supplier: ACCI Specialty Materials.

Epikure P-101 Epoxy-imidazole adduct having a softening range between 85° C. and 105° C. (a batch with 89° C. was used). Manufacturer/supplier: Hexion.

Sylfat FA1 Tall oil fatty acids. Manufacturer/supplier: Kraton.

Preparation of Fatty Acid-Modified Reactive Resin 2

In a reaction vessel, 76 g of Epon 828 were mixed with 56 g of Sylfat FA1 and heated to 250° C. The water formed was allowed to evaporate off. The product was used without further purification.

| Example: | K1 pts. by wt. | K2 pts. by wt. | K3 pts. by wt. | K4 pts. by wt. | K5 pts. by wt. |
|---|---|---|---|---|---|
| Breon N41H80 | 30 | 30 | 30 | 30 | 30 |
| Epon 828 | | | | | |

-continued

| Example: | K1 pts. by wt. | K2 pts. by wt. | K3 pts. by wt. | K4 pts. by wt. | K5 pts. by wt. |
|---|---|---|---|---|---|
| Araldite ECN 1273 | 30 | 30 | 30 | 30 | 30 |
| Struktol PD3611 | 20 | 20 | 20 | 20 | 20 |
| Reactive resin 1 | 20 | | 20 | 20 | 20 |
| Reactive resin 2 | | 20 | | | |
| 3-Glycidyloxypropyl triethoxysilane | | | | | |
| Dyhard 100S | 3.47 | 3.51 | 3.47 | 3.47 | 3.47 |
| Ajicure PN-50 | 2.1 | 2.1 | | | |
| Ancamine 2014FG | | | | | |
| Ajicure PN-40 | | | 2.1 | | |
| Ajicure MY-25 | | | | 2.1 | |
| Technicure LC-80 | | | | | 2.1 |
| Epikure P-101 | | | | | |

| Comparative example: | V1 pts. by wt. | V2 pts. by wt. | V3 pts. by wt. | V4 pts. by wt. |
|---|---|---|---|---|
| Breon N41H80 | 30 | 30 | 30 | 30 |
| Epon 828 | 20 | | 20 | |
| Araldite ECN 1273 | 30 | 30 | 30 | 30 |
| Struktol PD3611 | 20 | 20 | 20 | 20 |
| Reactive resin 1 | | 20 | | 20 |
| Reactive resin 2 | | | | |
| 3-Glycidyloxypropyl triethoxysilane | 2 | | | |
| Dyhard 100S | 3.61 | 3.47 | 3.61 | 3.47 |
| Ajicure PN-50 | 2.1 | | 2.1 | |
| Ancamine 2014FG | | 2.1 | | |
| Ajicure PN-40 | | | | |
| Ajicure MY-25 | | | | |
| Technicure LC-80 | | | | |
| Epikure P-101 | | | | 0.35 |

Production of the Adhesive Tapes

The adhesives were produced in a Haake analytical kneader at fill levels between 70% and 80%. Then an initial charge of nitrile rubber and Struktol PD3611 was kneaded with roller paddles at 60° C. until a constant torque was established. Then the further raw materials were added and kneaded. Finally, the curing agent and optionally the accelerator were added and kneaded at material temperature about 80° C. for about 5 minutes. The adhesive was pressed in a vacuum press to give 500 μm-thick transfer adhesive films in blister-free form between two siliconized PET films.

In a preliminary experiment, composition K0 (corresponding to K-1 but without Dyhard 100S curing agent) was produced and kneaded at 95° C. for 15 minutes in order to simulate the thermal stress of the extrusion process. After the pressing operation, this adhesive film was whitish, which shows that the accelerator withstands the kneading process in undissolved particulate and dispersed form.

K1 was additionally also produced in a continuous process and is to be found in the assessment table as K1*.

A planetary roll extruder from Rust & Mitschke with four coupled roll cylinders having an internal diameter of 70 mm was used. The first two roll cylinders were each equipped with 7 planetary spindles, and the next two each with 6 planetary spindles. The dispersion ring after the first roll cylinder had a free cross section of 38 mm, the dispersion ring after the second roll cylinder a free cross section of 34.5 mm, and the dispersion ring after the third roll cylinder a free cross section of 34 mm. In the present embodiment of the planetary roll extruder, the filler section has a conveying screw onto which the material can be dosed. The process parameters used are described in detail hereinafter.

Downstream of the planetary roll extruder, a twin screw extruder (TSE) was used as vented extruder (KraussMaffei Berstorff, screw diameter 42 mm, 36 L/D), with application of a reduced pressure of 200 mbar in a degassing zone. The vented extruder was at a temperature of 60° C. throughout, at a speed of 90 rpm.

The curing agent was metered in in the first third of the TSE. If curing agent and accelerator were used, mixtures (batches) of Dyhard 100S and the appropriate accelerator were produced in the appropriate mixing ratio and likewise metered in in the first third of the TSE. The mass flow rate reported is accordingly based on a mixture of curing agent and accelerator.

The exit temperature of the adhesive from the planetary roll extruder was in the range from 85° C. to 95° C. After passage through the downstream twin screw extruder, the temperatures were at a comparable level.

| | Zone 1 mass flow rate [kg/h] | | Zone 2 mass flow rate [kg/h] | Zone 3 mass flow rate [kg/h] | Mass flow rate in TSE degassing [kg/h] Dyhard 100S- |
|---|---|---|---|---|---|
| Experiment | Breon N41H80 | Araldite ECN 1273 | Struktol PD3611 | Reactive resin 1 | accelerator batch |
| K1* | 7.5 | 7.5 | 5 | 5 | 1.39 |

For the above examples, the following process parameters were chosen:

| | Zone 1 | Zone 2 | Zone 3 | Zone 4 |
|---|---|---|---|---|
| Number of planets | 7 | 7 | 6 | 6 |
| $T_{roll\ cylinder}$/° C. | 80 | 70 | 60 | 50 |
| $T_{central\ spindle}$/° C. | 30 | 30 | 30 | 30 |
| Dispersing ring diameter/mm | | 38 | 34.5 | 34 |
| Speed/rpm | | 70 | | |

Assessment of the Adhesive Tapes

| Example: | K1 | K1* | K2 | K3 | K4 | K5 | V1 | V2 | V3 | V4 |
|---|---|---|---|---|---|---|---|---|---|---|
| Uncured bonding force (steel)/N $cm^{-1}$ | 8.5 | 8.9 | 9.8 | 8.7 | 9.2 | 8.1 | 9.6 | 9.8 | 9.2 | 10.8 |
| Fracture profile in tip shear test after storage under moist/hot conditions* | C | C | C | C | C | C | C | C | A | C |

-continued

| Example: | K1 | K1* | K2 | K3 | K4 | K5 | V1 | V2 | V3 | V4 |
|---|---|---|---|---|---|---|---|---|---|---|
| Storability $Lf_{40}$ | 0.99 | 0.98 | 0.97 | 0.99 | 1 | 0.89 | 1 | 1 | 0.98 | 0.97 |
| Storability $Lf_{60}$ | 0.94 | 0.93 | 0.90 | 0.96 | 0.84 | 0.41 | 0.72 | 0.26 | 0.95 | n.d. |

n.d. (not determined) means that the sample cured within the storage time and no DSE measurement was made
*A = adhesive failure at the glass interface
C = complete cohesive failure
Storage conditions: 300 h at 65° C. and 90% RH The inventive adhesives K1 to K5 with the combination of fatty acid-modified epoxy resin and epoxy-amine adduct having a softening temperature of at least (not less than) 100° C. are notable for excellent storability $Lf_{60}\geq0.3$ coupled with simultaneously excellent bonding properties when stored under moist and hot conditions (300 h at 65° C., 90% RH). Only in the combination of the two raw materials of the invention is it possible to achieve both high storability and cohesive failure of the adhesive after storage under moist and hot conditions on glass substrates. As soon as one component is absent, there is either a reduction in storability, as in V2 with the example of a noninventive accelerator (Ancamine 2014FG), or the fracture profile after storage under moist and hot conditions is adhesive to the glass surface if the fatty acid-modified epoxy resin is absent (V3). The person skilled in the art is also aware of silanes as adhesion promoters. A typical silane for epoxy adhesives is 3-glycidyloxypropyltriethoxysilane, which was used in place of the inventive fatty acid-modified epoxy resin in V1. Although storability under moist and hot conditions is improved as expected—the fracture profile becomes cohesive—the low molecular weight liquid silane obviously has an adverse effect on storability, which falls below 0.8 in the $Lf_{60}$. Moreover, the addition of silanes after prolonged storage can lead to problems with the siliconized liners. We speculate that the improved storability of adhesives comprising the claimed combination of epoxy-amine adduct and fatty acid-modified epoxy resin is possibly attributable to the easy adjustment of the polarity of the adhesive. The fatty acid modification reduces the polarity, which reduces the solubility of the epoxy-amine adducts and hence increases storability.

It has been found that, surprisingly, epoxy-amine adducts can be processed thermally, for example at 90° C., especially when the viscosity of the adhesive, contrary to expectation, is high even at this high temperature. We speculate that the unwanted premature dissolution of such adducts in reactive resins is slowed or suppressed on account of the high viscosity. Advantageous viscosities of the hot adhesive have been found to be greater than 10 Pa s at 90° C., especially greater than 100 Pa s. Even adhesives having viscosities exceeding 1000 Pa s at 90° C. were processible both in an extruder and in a laboratory kneader and showed very preferred storabilities, which is attributed to the surprising interaction between melt viscosity and epoxy-amine adducts. The person skilled in the art would certainly prefer lower viscosities since the adduct particles could be brought into solution by distinctly lower shear forces in such a system.

For storability at 60° C., it has been found that, surprisingly, the softening temperature of the accelerators must be at least 40° C. higher. Thus, epoxy-amine adducts with softening points of not less than 100° C. result in adhesives that are storage-stable at 60° C. (K1-K5). V4 contains an epoxy-amine accelerator having a softening point well above 60° C., but below 100° C. These systems are not storage-stable at 60° C. The temperature limit becomes even more clear on comparison of K3 with K5. For instance, the Ajicure PN-40 accelerator used in K3 has a softening point of 107° C., and the Technicure LC-80 accelerator used in K5 a softening point of 100° C. Although K5 has a certain degree of storability at 60° C., the difference from K3 is significant.

Without wishing to be bound to this theory, there is additionally suspected to be a positive interaction of the curing agent used in accordance with the invention with the shear stresses and thermal stresses that exist in the planetary roll extruder. It is particularly good for a particularly long storability when the curing agent does not dissolve in the adhesive during the production process. These epoxy-amine adducts are likely to become "harder" with a softening temperature of not less than 100° C. and hence more resistant to the shear forces.

Example K6—Bending Test for Ascertainment of Stiffness

A specimen consisting of 250 individual wires having a wire cross section of 0.35 $mm^2$ was bundled with the aid of a 9 mm-wide adhesive tape (tesa 51618) to give a specimen cable harness, such that the specimen cable harness had a diameter of 23±5 mm and a length of 300±50 mm. This specimen cable harness was wrapped with an adhesive tape comprising an adhesive of the invention in spiral form, ensuring an overlap of 50%. Subsequently, the adhesive tape was cured by means of heat.

For production of the adhesive tape, a 19 mm- to 20 mm-wide and 220 µm-thick PET fabric carrier having a basis weight of 130 $g/m^2$ was coated with an adhesive according to example K1 at a coatweight of 150 $g/m^2$.

The cured specimen cable harness was subjected to a bending test in order to determine the influence of the stiffening material on stiffness. The bending test was undertaken on a tensile tester. For this purpose, the specimen cable harness was placed onto two jaws separated by 70 mm and subjected to a load in the middle with a crosshead for indentation by a distance of 30 mm.

The force needed for the deformation of the measurement distance was recorded by a tensile tester in newtons. The testing speed was 100 mm/min both in the application of load to and in the removal of load from the specimen cable harness. The test was conducted in 3 different places on the cable harness (beginning, middle and end). The bending force results from the average of the three individual measurements and was assessed in three categories as follows:

Assessment Categories for 3-Point Bending Test:

+ of good suitability for the application (500-750 N)
○ of limited suitability for the application (400-500 N and 700-800 N)
– unsuitable for the application (<400 and >800 N)

By way of comparison, a commercially available adhesive tape, Tesa® 51036, was subjected to the same test. The results are listed in table 1 below.

Example K7—C-Shape Test for Ascertainment of Stiffness at Different Temperatures A test method was developed to ascertain the stiffness of a bent cable specimen (C cable specimen bending test). For production of a C cable specimen (see FIG. 1), a cable wire (10) having a wire cross section of 0.35 $mm^2$ is wound 100 times around a holder (1) to give a specimen cable harness. The holder (1) has two opposite semicircular guides (2, 3) having a diameter of 120 mm, spaced apart by a distance (A) of about 210 mm. The wound cable harness is shown in FIG. 1.

The number of cable windings is 100. The result is a specimen cable harness having a diameter of 15±5 mm and a circumference of 690 mm. At the apexes of the semicircular segments and in two linear sections (limbs) in each case, the cable bundle (10) is constricted with cable ties (4, 5, 6, 7, 8, 9) with a tensile force of 210±10 N and fixed such that the cable bundle (10), after removal from the holder, has sufficient stiffness to not deform. In order to further improve the stiffness of the cable bundle (10), a rest (11) is positioned between the limbs of the cable bundle and likewise fixed with cable ties.

The cable bundle (10) thus produced is removed from the holder and wrapped with the adhesive tape to be tested (width 19 mm-20 mm) with a 50% overlap. For this purpose, wrapping is commenced at a cable tie (for example 6 or (7)) of the limb in the circular segment direction ((6)->(4) or (7)->(5)). When the wrapping reaches the cable tie (4) or (5) at the apex of the semicircular segment, the cable tie is removed and the wrapping is continued up to the next cable tie ((4)->(8) or (5)->(9)) on the opposite limb. The same procedure is also followed on the other side, in the other semicircular segment.

The specimens thus prepared are subjected to the appropriate crosslinking method (thermal energy, 110° C.). Wire cutters are used to cut open the specimens adjacent to the cable ties still present in order to obtain two “C-shaped” cable specimens (C cable specimens), each also having an unwrapped section on either side of the semicircular wrapped section. The cut is made at the distance of the diameter (120 mm) from the apex of the semicircular segment, projected to the middle of the circle.

A piece of cable is used to form loops at the ends of the limbs of the specimens, in order that it can be suspended at one end and a weight can be hung on at the other end. The remaining cable ties are now removed since they can distort the test result. The distance between the limbs is then determined.

One of the two specimens is stored at room temperature, and the other at 60° C.

A 1 kg weight is hung on the respective lower limb of the “C specimen”. After one hour, the deflection of the cable bundle is noted (deflection behavior 1 h at RT or at 60° C.) and the weight is removed. After one minute, the deflection is determined again (resilience behavior 1 min at RT or at 60° C.). After one hour, the deflection is determined again and noted (resilience behavior 1 h at RT or at 60° C.).

The values ascertained in the C-shape deformation were classified into three categories: of good suitability for the application, of limited suitability for the application, and unsuitable for the application. The categories were assessed as follows:

Assessment Categories for C-Shape Bending Test (Room Temperature):

+ of good suitability for the application (<15% deflection)
○ of limited suitability for the application (>15-30%)
– unsuitable for the application (>30%)

Assessment Categories for C-Shape Bending Test (60° C.):

+ of good suitability for the application (<25% deflection)
○ of limited suitability for the application (>25-40%)
– unsuitable for the application (>40%)

Assessment Categories for C-Shape Bending Test (Resilience Behavior at RT and 60° C.):

+ of good suitability for the application (<10% deflection)
○ of limited suitability for the application (10-30%)
– unsuitable for the application (>30%)

By way of comparison, a commercially available adhesive tape, Tesa® 51036, was subjected to the same test. The results are likewise listed in table 1 below.

TABLE 1

| | 3-point bending test | C-shape deformation at RT | C-shape resilience behavior at RT |
|---|---|---|---|
| Example 1 | + | + | + |
| tesa ® 51036 | – | – | – |

| | C-shape deformation at 60° C. | C-shape resilience behavior at 60° C. |
|---|---|---|
| Example 1 | + | + |
| tesa ® 51036 | – | – |

Legend:
+ of good suitability for the application
○ of limited suitability for the application
– unsuitable for the application

The invention claimed is:

1. A method of jacketing elongate items with an adhesive tape comprising a carrier in strip form that has been provided on at least one side with a curable composition comprising one or more epoxy resins and at least one curing reagent for epoxy resins, wherein at least one of the epoxy resins used is a fatty acid-modified epoxy resin and the curing reagent comprises at least one epoxy-amine adduct that is the reaction product of (A) at least one epoxy compound comprising a molecule having at least one cyclic ether group and (B) at least one amine compound, said at least one epoxy-amine adduct having a softening point of at least 100° C., said adhesive tape having a storability (Lf) as determined by dynamic differential calorimetry (DSC) of ≥0.84 after storage for 10 days at 60° C., said method comprising running the adhesive tape in a helical line around the elongate item or wrapping the elongate item by the adhesive tape in an axial direction, putting the elongate item together with the adhesive tape in a desired arrangement, holding the elongate item and the adhesive tape in this arrangement, and making the curable composition to cure by supplying thermal energy at a temperature between 120° C. and 200° C. for 10 to 120 minutes.

2. The method as claimed in claim 1, wherein the fatty acid-modified epoxy resin used comprises esterification products of bisphenol epoxy resins with saturated or unsaturated fatty acids.

3. The method as claimed in claim 1, wherein the bisphenol epoxy resins are selected from the group consisting of bisphenol epoxy resin compounds of the following formula:

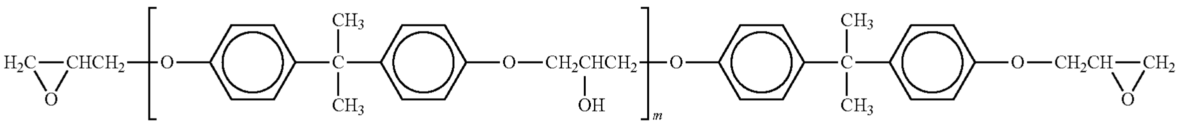

where the average of m is 0.07 to 16.4.

4. The method as claimed in claim 3, wherein the bisphenol epoxy resins have an epoxy equivalent weight of between 180 g/eq and 5000 g/eq.

5. The method as claimed in claim 1, wherein the fatty acid-modified epoxy resin is an epoxy resin modified with a fatty acid selected from:

coconut oil fatty acid, ricinene fatty acid (fatty acid of dehydrated castor oil), linseed oil fatty acid, soya oil fatty acid, tall oil fatty acid, α-linolenic acid, stearidonic acid, eicosapentaenoic acid, docosahexaenoic acid, linoleic acid, γ-linolenic acid, dihomo-gamma-linolenic acid, arachidonic acid, docosa-7,10,13,16-tetraen-1-oic acid, palmitoleic acid, vaccenic acid, oleic acid, elaidic acid, gadoleic acid, 13-eicosenoic acid, erucic acid, nervonic acid, stearic acid, or Mead's acid, and/or dimers and/or oligomers of the aforementioned fatty acids.

6. The method as claimed in claim 1, wherein the epoxy-amine adduct is used in particulate form.

7. The method as claimed in claim 1, wherein the at least one epoxy compound having at least one cyclic ether group is a polyfunctional epoxy compound.

8. The method as claimed in claim 7, wherein the polyfunctional epoxy compound is a polyglycidyl ether, a polyglycidyl ether ester, a polyglycidyl ester, a glycidylamine, an epoxidized novolak, or an epoxidized polyolefin.

9. The method as claimed in claim 1, wherein the amine compound is a compound comprising at least one tertiary amino group.

10. The method as claimed in claim 1, wherein a further starting material added in the preparation of the epoxy-amine adduct is a stabilizing component.

11. The method as claimed in claim 10, wherein the stabilizing component is used in the presence of 0.05 to 5.0 molar equivalents of water per molar equivalent of epoxy groups in the compound of the epoxy-amine adduct having the at least one cyclic ether group.

12. The method as claimed in claim 1, wherein the amine compound conforms to one of the following general formulae:

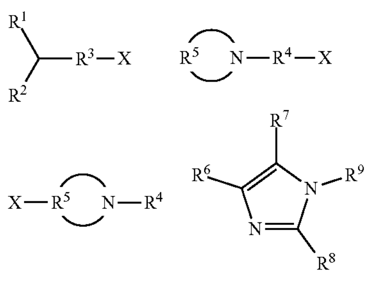

where

X is —OH, —$NH_2$, —NH or —SH, $R^1$ and $R^2$ are independently selected from the group consisting of hydrogen atoms, $C_1$— to $C_{20}$-alkyl groups, $C_2$— to $C_{20}$-alkenyl groups, unsubstituted aromatic hydrocarbyl groups, substituted aromatic hydrocarbyl groups, optionally substituted by oxygen, halogen, —OH, —$NH_2$, —NH and/or —SH, $R^3$ is a saturated or unsaturated, unbranched or branched hydrocarbon chain having 1 to 20 carbon atoms, $R^4$ is a saturated or unsaturated, unbranched or branched hydrocarbon chain having one to 20 carbon atoms, $R^5$ is a cyclic aliphatic or aromatic, saturated or unsaturated, substituted or unsubstituted hydrocarbon radical which has two bonds to the nitrogen atom and has 2 to 20 carbon atoms, and which may be partly substituted by heteroatoms, $R^6$, $R^7$, $R^8$ and $R^9$ are independently selected from the group consisting of hydrogen atoms, $C_1$— to $C_{20}$-alkyl groups, $C_2$— to $C_{20}$-alkenyl groups, unsubstituted aromatic hydrocarbyl groups, substituted aromatic hydrocarbyl groups, optionally substituted by oxygen, halogen, —OH, —$NH_2$, —NH and/or —SH, —OH, —$NH_2$, —NH and/or —SH, with the proviso that $R^9$=H, or that at least one of the $R^6$, $R^7$ and/or $R^8$ groups is one of the —OH, —$NH_2$, —NH or —SH groups.

13. The method according to claim 1, wherein the amine compound is selected from the group consisting of 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl) phenol, 2,4,6-tris(dimethylaminomethyl) phenol, N-β-hydroxyethylmorpholine, 2-dimethylaminoethylamine, 3-dimethylamino-n-propylamine, 2-diethylaminoethylamine, 3-diethylamino-n-propylamine, N-methylpiperazine, imidazole, 2-methylimidazole, 2-ethylimidazole, 2-ethyl-4-methylimidazole, 2-isopropylimidazole, 2-undecylimidazole, 2-octadecylimidazole, 2-phenylimidazole, 2-phenyl-4-methylimidazole, 2-dimethylaminoethanethiol, methimazole, 2-mercaptobenzoimidazole, and 2-mercaptobenzothiazole.

14. The method as claimed in claim 1, wherein the curing reagent comprises one or more compounds other than the epoxy-amine adduct as curing agents or accelerators for the curing reaction of the fatty acid-modified epoxy resin.

15. The method as claimed in claim 14, wherein the curing agents or accelerators other than the epoxy-amine adduct are selected from the list of dicyandiamide anhydrides blocked or unblocked imidazoles hydrazides reaction products of diacids and polyfunctional amines.

16. The method as claimed in claim 1, wherein the curable composition is a pressure-sensitive adhesive.

17. The method as claimed in claim 1, wherein the curable composition is in film form or has been introduced into a matrix in film form.

18. The method as claimed in claim 1, wherein further epoxy resins other than the fatty acid-modified epoxy resin are present.

19. A jacketed elongate item obtained according to claim 1.

20. A vehicle comprising a jacketed elongate item as claimed in claim 19.

* * * * *